US008223224B2

(12) United States Patent
Sakamoto

(10) Patent No.: US 8,223,224 B2
(45) Date of Patent: Jul. 17, 2012

(54) ZOOM LENS AND IMAGE PICKUP APPARATUS EQUIPPED WITH SAME

(75) Inventor: Masaru Sakamoto, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 170 days.

(21) Appl. No.: 12/857,012

(22) Filed: Aug. 16, 2010

(65) Prior Publication Data
US 2011/0037880 A1  Feb. 17, 2011

(30) Foreign Application Priority Data

Aug. 17, 2009  (JP) .................................. 2009-188459

(51) Int. Cl.
H04N 5/262 (2006.01)
G02B 15/14 (2006.01)
G02B 9/60 (2006.01)
G02B 9/36 (2006.01)

(52) U.S. Cl. .................... 348/240.3; 359/688; 359/765; 359/775

(58) Field of Classification Search .............. 348/240.3; 359/688, 765, 775
See application file for complete search history.

(56) References Cited

U.S. PATENT DOCUMENTS

| 3,868,174 | A |   | 2/1975 | Yakota |
| 4,439,017 | A |   | 3/1984 | Yamaguchi |
| 4,451,124 | A | * | 5/1984 | Basista et al. ............. 359/687 |
| 4,629,293 | A | * | 12/1986 | Mihara ..................... 359/688 |
| 5,757,554 | A |   | 5/1998 | Fukami |
| 5,831,771 | A | * | 11/1998 | Suzuki ..................... 359/689 |
| 5,966,246 | A |   | 10/1999 | Yoshikawa |
| 6,002,528 | A | * | 12/1999 | Tomita .................... 359/684 |
| 6,124,982 | A |   | 9/2000 | Usui |
| 6,512,637 | B1 |   | 1/2003 | Tomita |
| 6,545,818 | B2 |   | 4/2003 | Usui et al. |

(Continued)

FOREIGN PATENT DOCUMENTS

EP   0 751 414 A2   1/1997

(Continued)

OTHER PUBLICATIONS

Smith, W J. "Modern optical engineering: the design of optical systems", Modren Optical Engineering, Jan. 1, 1996, Mc-Graw-Hill, New York, NY, XP002564589, pp. 145-150, 248-249, 269-270, 280-284, and 334-340.

(Continued)

*Primary Examiner* — Aung S Moe
*Assistant Examiner* — Chia-Wei A Chen
(74) *Attorney, Agent, or Firm* — Rossi, Kimms & McDowell LLP

(57) ABSTRACT

A zoom lens comprises first and fourth units which don't move for zooming, and second and third units moved during zooming. The first unit includes a front side partial unit which don't move for focusing, a movable partial unit moved for focusing, and a rear side partial unit which don't move for focusing, the rear side partial unit includes positive lenses and one or more negative lenses, and the following conditions are satisfied: $-1.2 \times 10^{-3} < (\theta pa - \theta n)/(\nu pa - \nu n)$, and $\nu n < 30$, where $\nu n$ is the smallest Abbe number of the material of the negative lenses, $\theta n$ is the partial dispersion ratio of the material of the negative lens of the smallest Abbe number, $\nu pa$ is the average of the Abbe numbers $\nu$ of the materials of positive lenses, and $\theta pa$ is the average of the partial dispersion ratio $\theta$ of the materials of the positive lenses.

11 Claims, 12 Drawing Sheets

U.S. PATENT DOCUMENTS

| | | | |
|---|---|---|---|
| 7,139,131 B2* | 11/2006 | Nanba et al. | 359/687 |
| 7,916,399 B2* | 3/2011 | Miyano | 359/688 |
| 2003/0007256 A1 | 1/2003 | Usui et al. | |
| 2006/0285224 A1* | 12/2006 | Endo et al. | 359/689 |

FOREIGN PATENT DOCUMENTS

| | | |
|---|---|---|
| EP | 1 052 535 A1 | 11/2000 |
| JP | 9-258102 A | 10/1997 |

OTHER PUBLICATIONS

Longhurst, R S. "Geometrical and physical optics", Geometrical and Physical Opticals, Jan. 1, 1996, Longmans, Green & Co., London, GB, XP002564590, pp. 330-332.

Extended European Search Report issued in corresponding European Patent Application No. 10171236.2 dated Oct. 29, 2010.

* cited by examiner

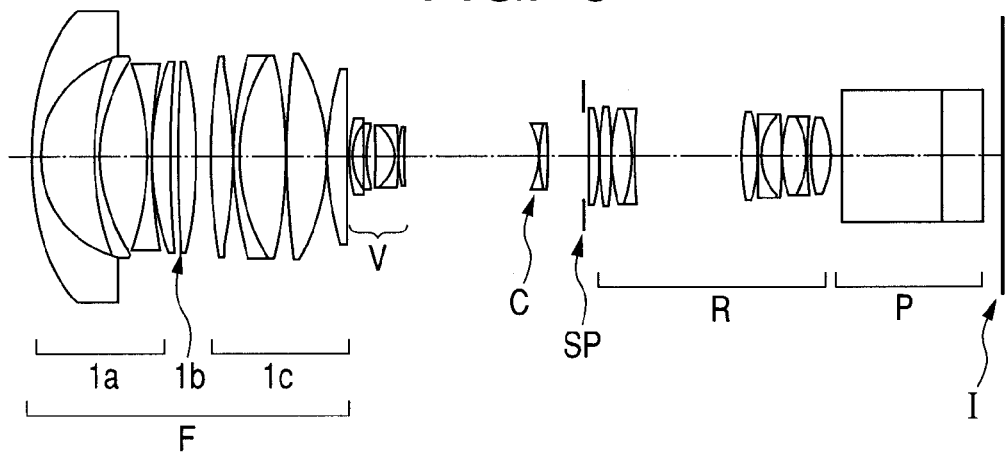
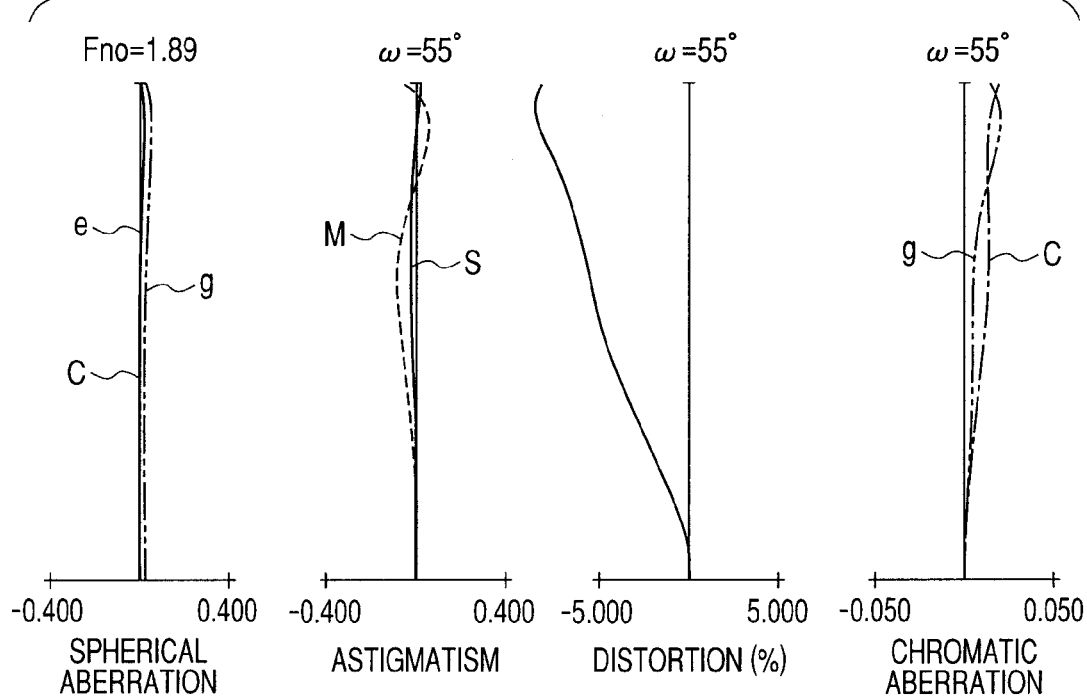

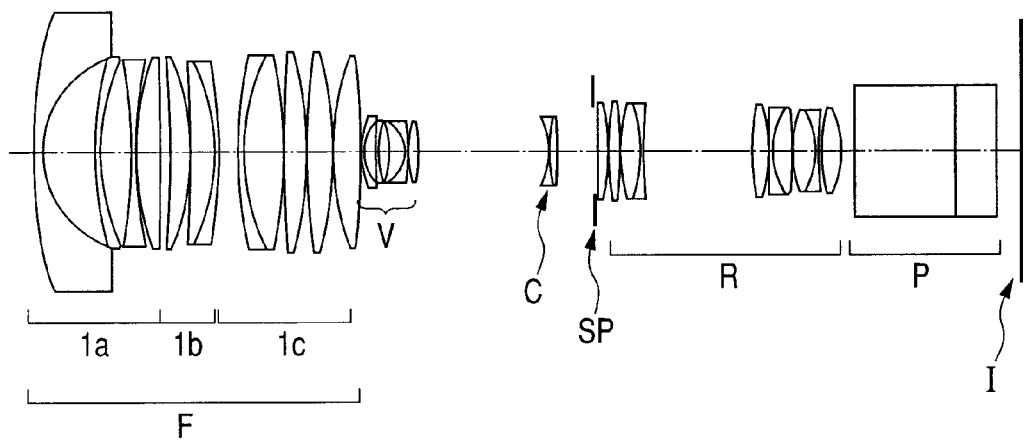
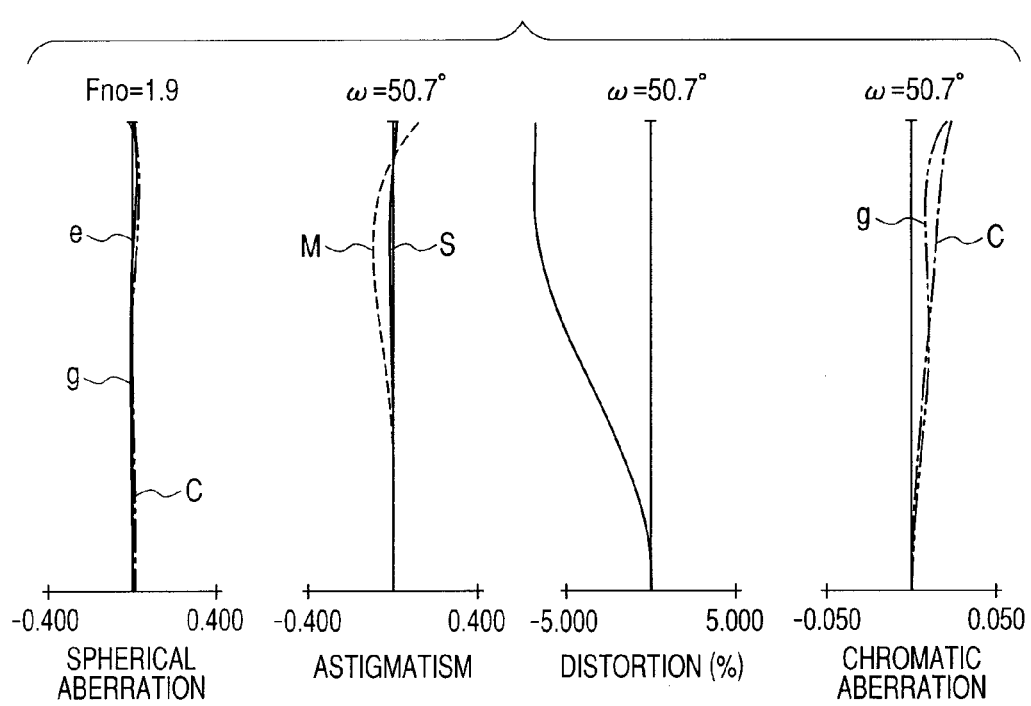

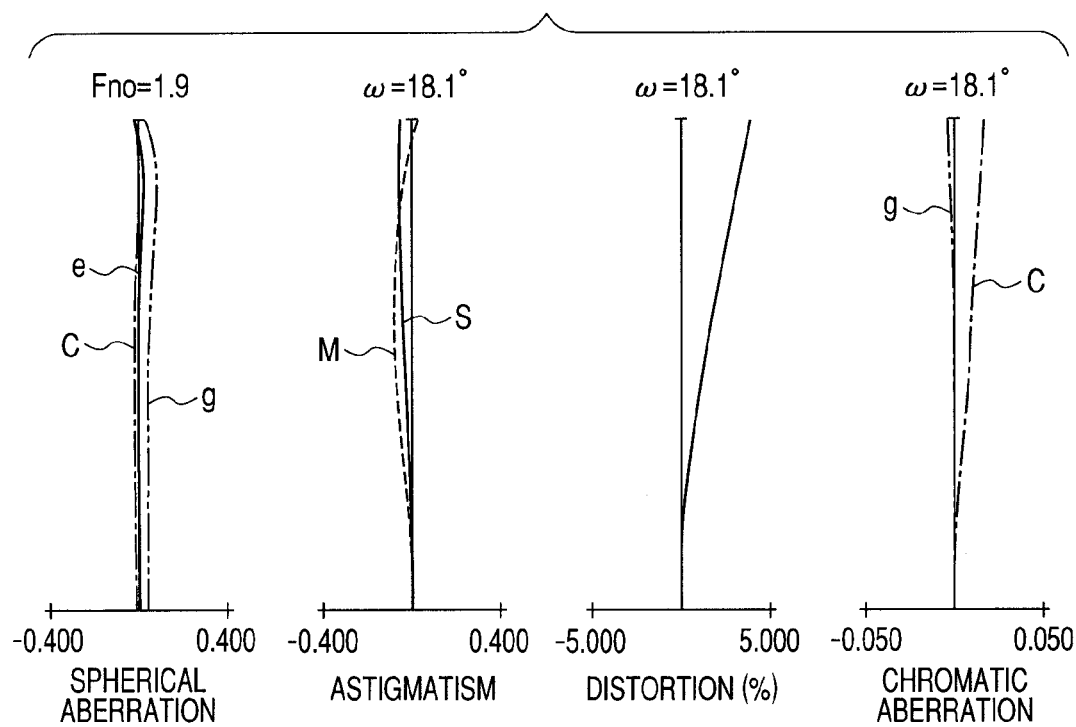
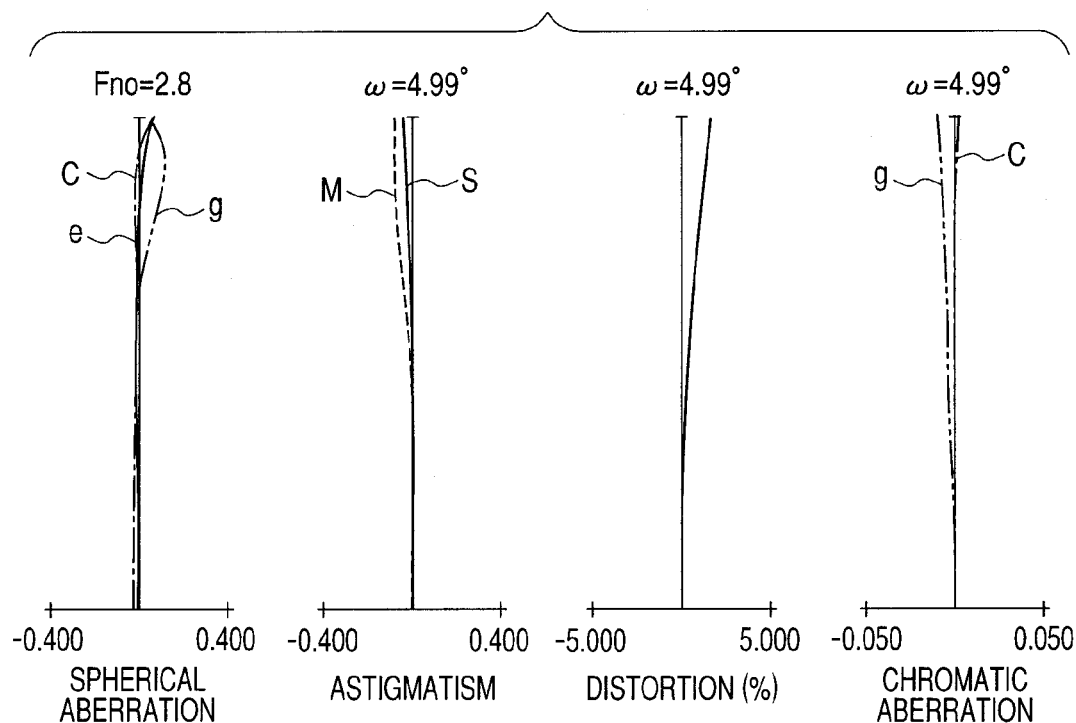

ZOOM LENS AND IMAGE PICKUP APPARATUS EQUIPPED WITH SAME

BACKGROUND OF THE INVENTION

1. Field of the Invention

The present invention relates to a zoom lens and an image pickup apparatus equipped with the same. The present invention can suitably be applied to broadcast television cameras, video cameras, digital still cameras, and film cameras.

2. Description of the Related Art

In recent years, zoom lenses having a high zoom ratio, a wide angle of view, and high optical performance have been demanded for use in image pickup apparatuses such as television cameras, film cameras, digital cameras, and video cameras. As zoom lenses having a high zoom ratio and a wide angle of view, positive-lead type, four-unit zoom lenses that have four lens units in total including a lens unit having a positive refractive power disposed closest to the object side have been known. A known four-unit zoom lens of this type comprises, in order from the object side to the image side, a first lens unit for focusing, a second lens unit having a negative refractive power for zooming, a third lens unit having a negative refractive power for correcting image plane variations during zooming, and a fourth lens unit having a positive refractive power for imaging. Four-unit zoom lenses of this type having a high zoom ratio and a wide angle of view have been known from U.S. Pat. Nos. 6,124,982, 5,966,246, Japanese Patent Application Laid-Open No. H09-258102, and U.S. Pat. No. 6,545,818. These patent documents disclose zoom lenses having a zoom ratio of approximately 10 to 12, an angle of view of approximately 80° to 100° at the wide angle end.

The positive-lead type four-unit zoom lens can relatively easily designed to have a high zoom ratio and a wide angle of view. However, if it has a zoom ratio as high as 10 and an angle of view as wide as 80° or wider, large variations of aberrations will occur during zooming, making it difficult to achieve high optical performance throughout the entire zoom range. In particular at zoom positions near the telephoto end, large magnification chromatic aberration and on-axis chromatic aberration occur. Therefore, in order to achieve performance that provides high quality images, it is important to achieve good correction of chromatic aberration in terms of not only first-order spectrum but also second-order spectrum. In order to achieve good correction of chromatic aberration and high optical performance while achieving a high zoom ratio of approximately 10 and a wide angle of view of 80° or wider in the four-unit zoom lens of this type, appropriate lens configuration of the first lens unit is an important factor. Inappropriate lens configuration of the first lens unit lead to large variations in aberrations such as chromatic aberration, spherical aberration, halo, and coma, making it difficult to achieve high performance with a high zoom ratio and a wide angle of view. In particular, when a zoom lens is designed to have a high zoom ratio of approximately 10 and a wide angle of view of approximately 100° at the wide angle end, large on-axis chromatic aberration tends to occur at the telephoto end. Furthermore, large residual aberrations with respect to second-order spectrum tend to remain. It is difficult to correct these aberrations satisfactorily.

SUMMARY OF THE INVENTION

A zoom lens according to the present invention comprises, in order from the object side to the image side, a first unit having a positive refractive power that is not moved for zooming, a second unit having a negative refractive power that is moved during zooming, a third unit having a negative refractive power that is moved during zooming, and a fourth unit having a positive refractive power that is not moved for zooming, wherein the first unit includes, in order from the object side to the image side, a front side partial unit having a negative refractive power that is not moved for focusing, a movable partial unit having a positive refractive power that is moved for focusing, and a rear side partial unit having a positive refractive power that is not moved for focusing, the rear side partial unit includes a plurality of positive lenses and one or more negative lenses, and the following conditions are satisfied:

$$-1.2 \times 10^{-3} < (\theta pa - \theta n)/(\nu pa - \nu n), \text{ and}$$

$$\nu n < 30,$$

where $\nu n$ is the Abbe number of the material of the negative lens that has the smallest Abbe number among the one or more negative lenses, $\theta n$ is the partial dispersion ratio of the material of the negative lens that has the smallest Abbe number among the one or more negative lenses, $\nu pa$ is the average of the Abbe numbers $\nu$ of the materials of the plurality of positive lenses, and $\theta pa$ is the average of the partial dispersion ratios $\theta$ of the materials of the plurality of positive lenses where the partial dispersion ratio $\theta$ is provided by and equation of:

$$\theta = (Ng - NF)/(NF - NC),$$

where $Ng$ is a refractive index of g-line, $NF$ is a refractive index of F-line, and $NC$ is a refractive index of C-line.

Further features of the present invention will become apparent from the following description of exemplary embodiments with reference to the attached drawings.

BRIEF DESCRIPTION OF THE DRAWINGS

FIG. 3 is a cross sectional view of a zoom lens according to numerical embodiment 2 at the wide angle end.

FIGS. 4A, 4B, and 4C are aberration diagrams of the zoom lens according to numerical embodiment 2 respectively at the wide angle end, at an intermediate zoom position, and at the telephoto end.

FIG. 7 is a cross sectional view of a zoom lens according to numerical embodiment 4 at the wide angle end.

FIGS. 8A, 8B, and 8C are aberration diagrams of the zoom lens according to numerical embodiment 4 respectively at the wide angle end, at an intermediate zoom position, and at the telephoto end.

FIGS. 10A, 10B, and 10C are aberration diagrams of the zoom lens according to numerical embodiment 4 respectively at the wide angle end, at an intermediate zoom position, and at the telephoto end.

DESCRIPTION OF THE EMBODIMENTS

Preferred embodiments of the present invention will now be described in detail in accordance with the accompanying drawings.

An object of the present invention is to provide a zoom lens having a high zoom ratio and wide angle of view and having high optical performance throughout the entire zoom range in which chromatic aberration is favorably corrected throughout the entire zoom range from the wide angle end to the telephoto end, and to provide an image pickup apparatus equipped with such a zoom lens.

In the following, embodiments of the present invention will be described in detail with reference to the drawings. The zoom lens according to the present invention has the following lens units arranged in order from the object side to the image side: a first lens unit having a positive refractive power that is not moved for zooming, a second lens unit having a negative refractive power that is moved during zooming, a third lens unit having a negative refractive power that is moved during zooming, a forth lens unit having a positive refractive power that is not moved for zooming. The first lens unit comprises a front side partial unit having a negative refractive power that is not moved for focusing, a movable partial unit having a positive refractive power that is moved for focusing, and a rear side partial unit having a positive refractive power that is not moved for focusing.

Figure 1:
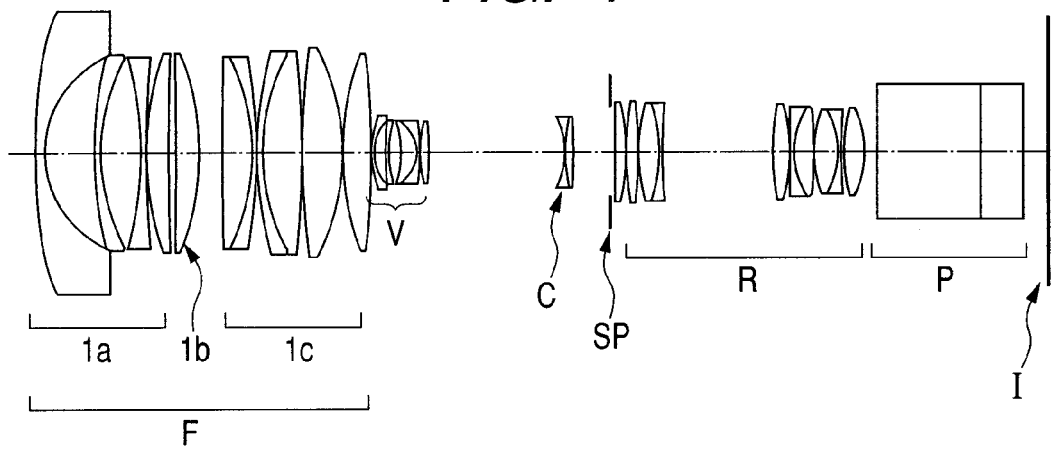
FIG. 1 is a cross sectional view of a zoom lens according to numerical embodiment 1 at the wide angle end.
Figure 2A:
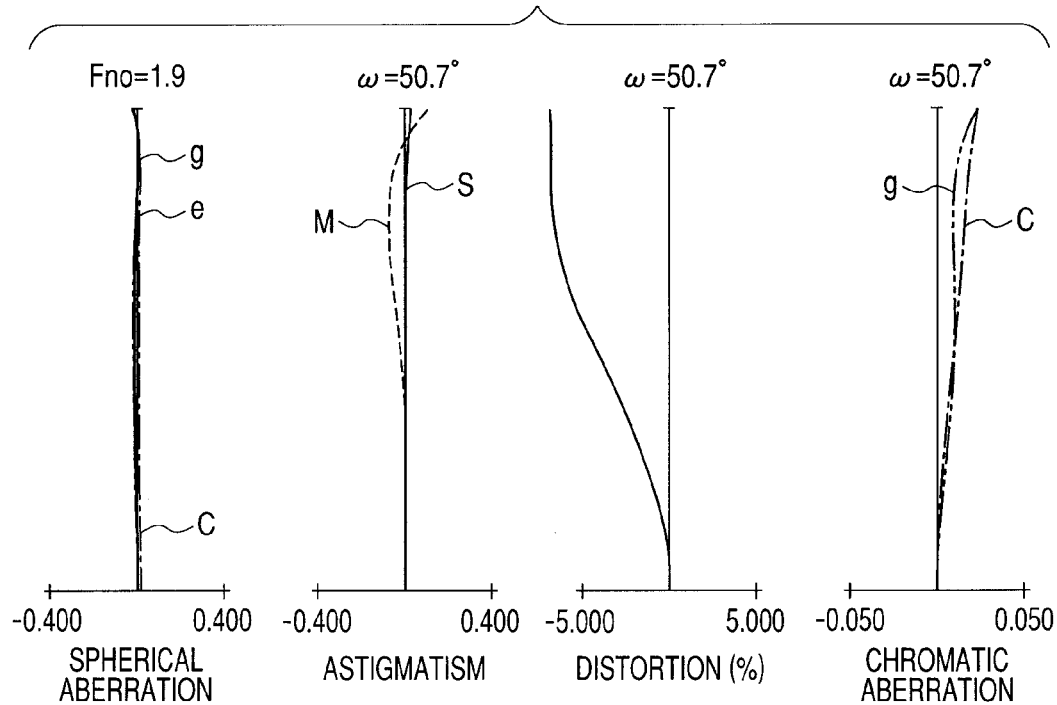
FIGS. 2A, 2B, and 2C are aberration diagrams of the zoom lens according to numerical embodiment 1 respectively at the wide angle end, at an intermediate zoom position, and at the telephoto end.
Figure 2B:
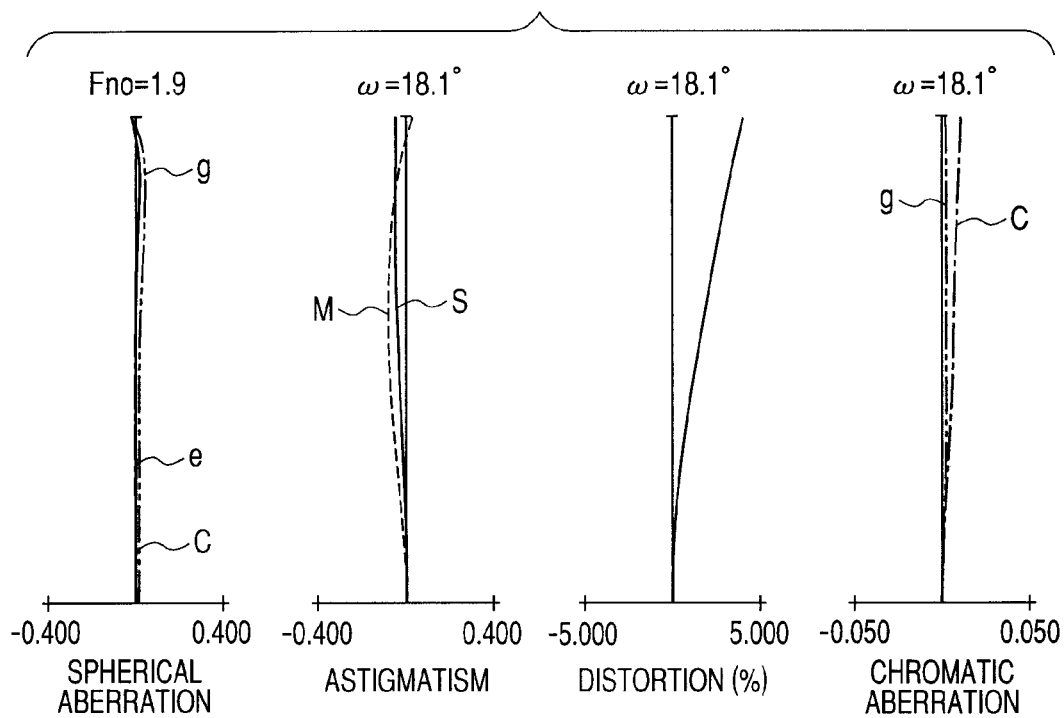
Figure 2C:
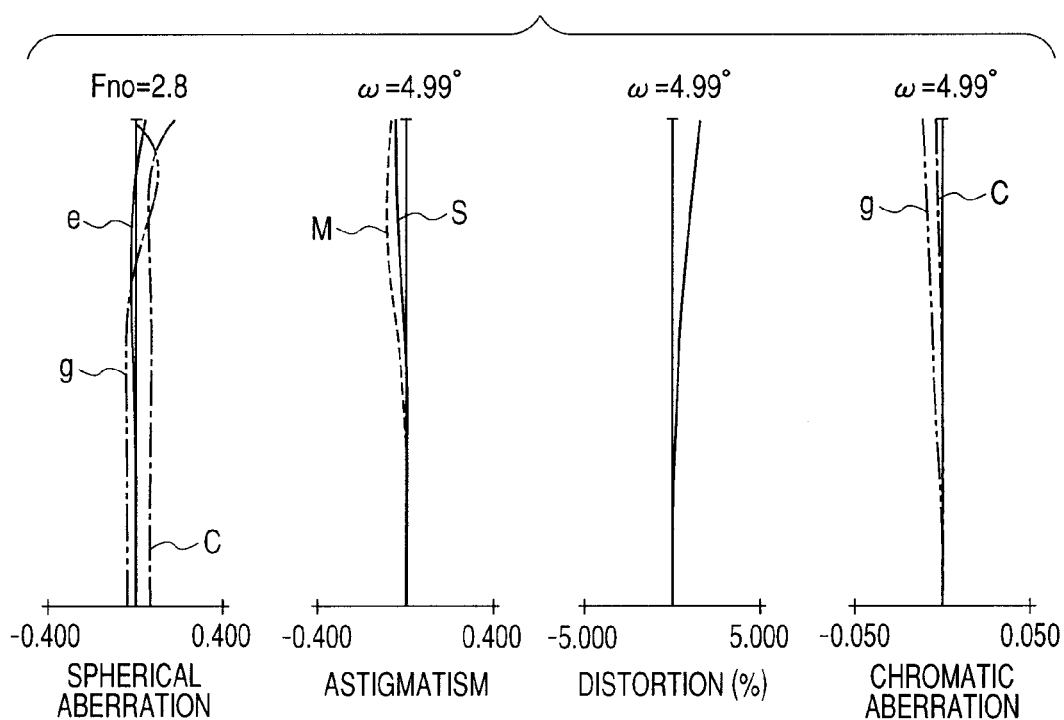
Figure 4B:
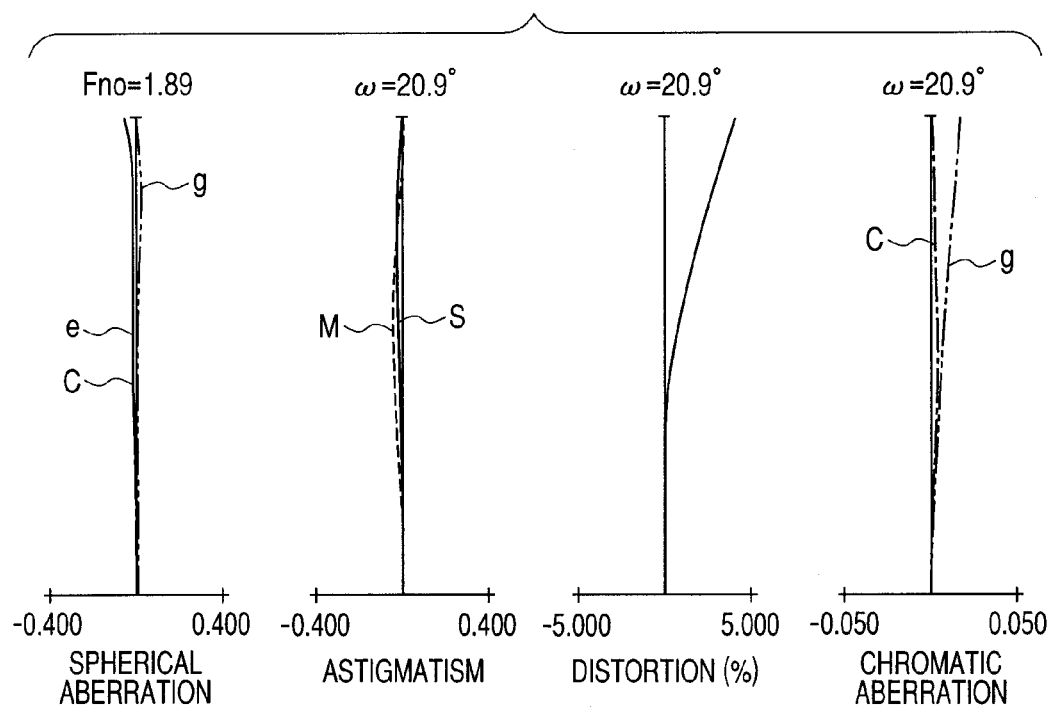
Figure 4C:
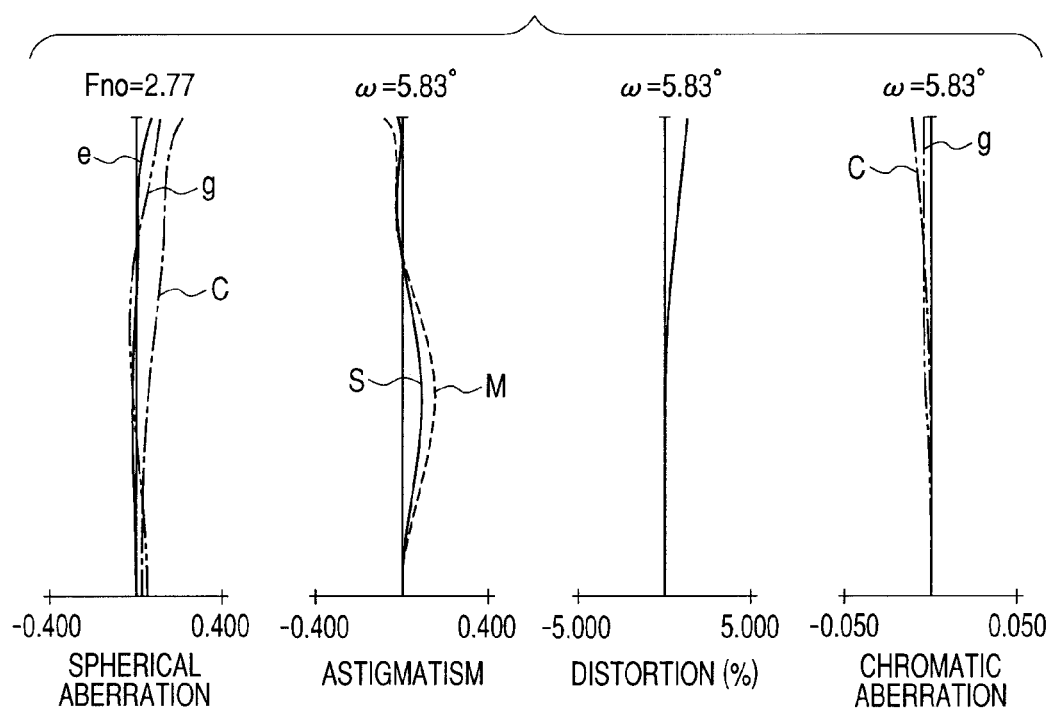
Figure 5:
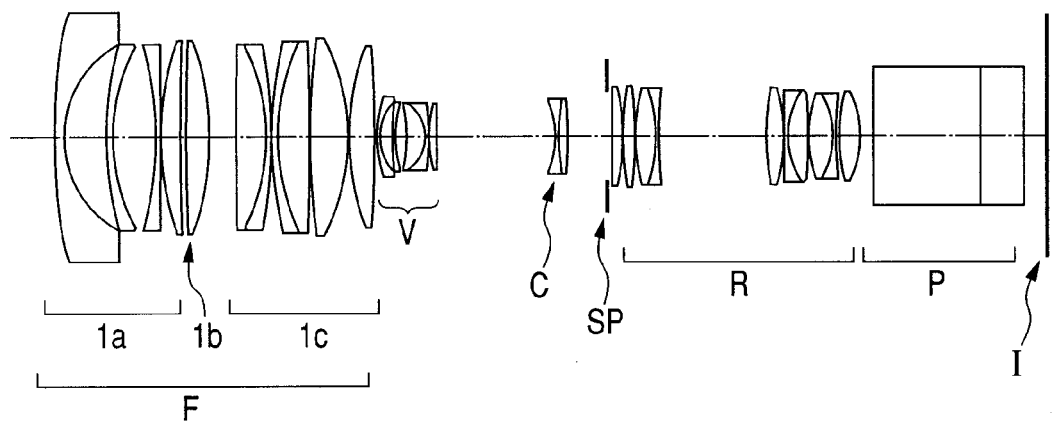
FIG. 5 is a cross sectional view of a zoom lens according to numerical embodiment 3 at the wide angle end.
Figure 6A:
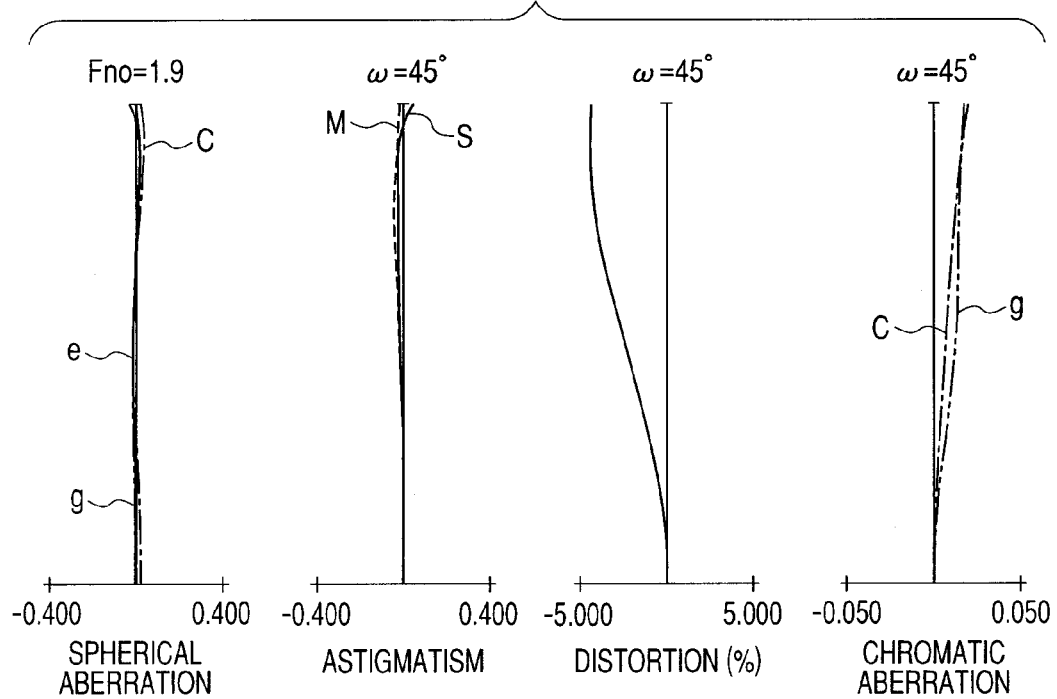
FIGS. 6A, 6B, and 6C are aberration diagrams of the zoom lens according to numerical embodiment 3 respectively at the wide angle end, at an intermediate zoom position, and at the telephoto end.
Figure 6B:
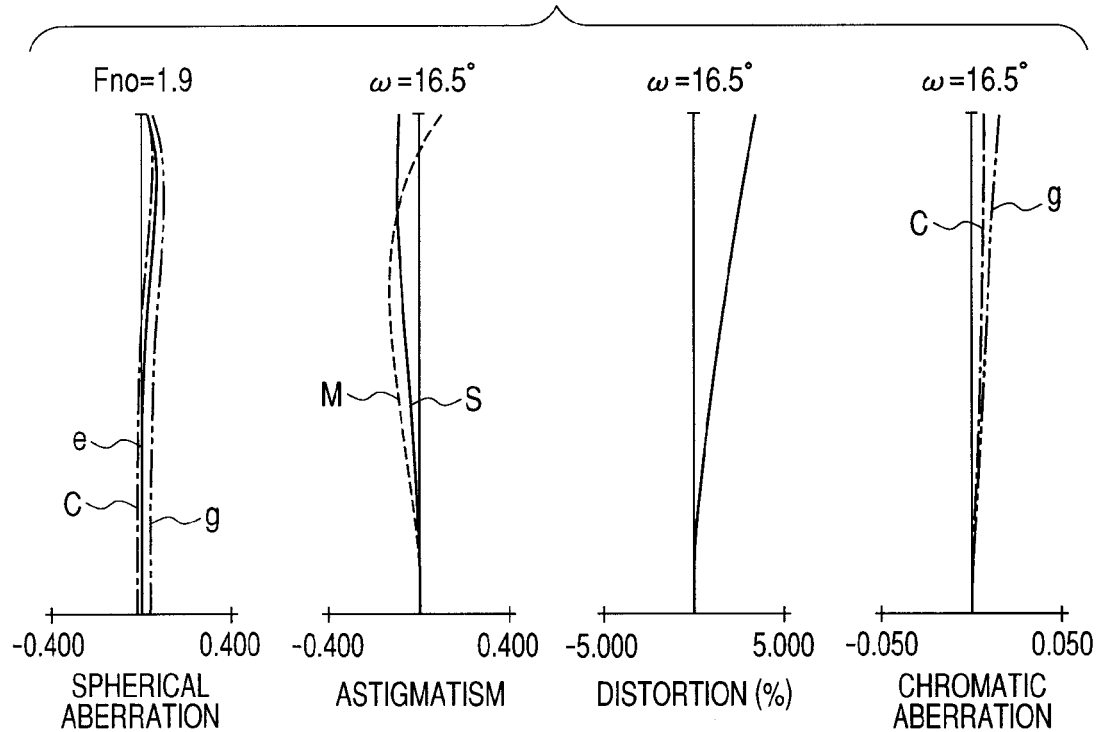
Figure 6C:
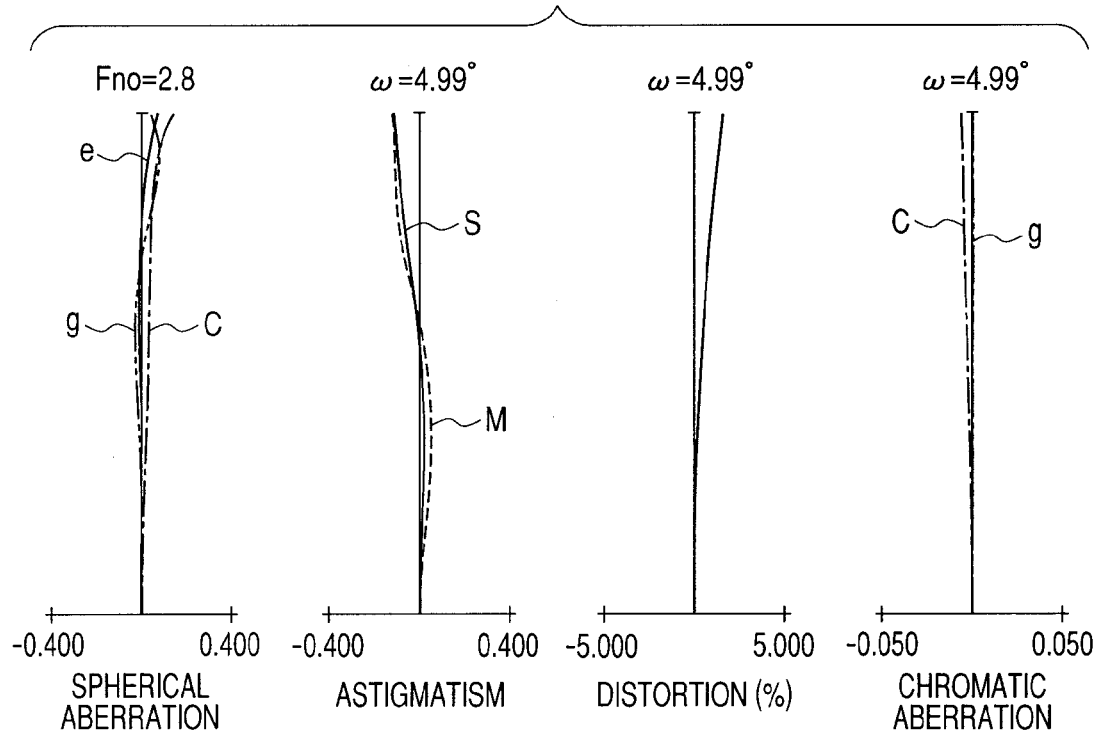
Figure 8B:
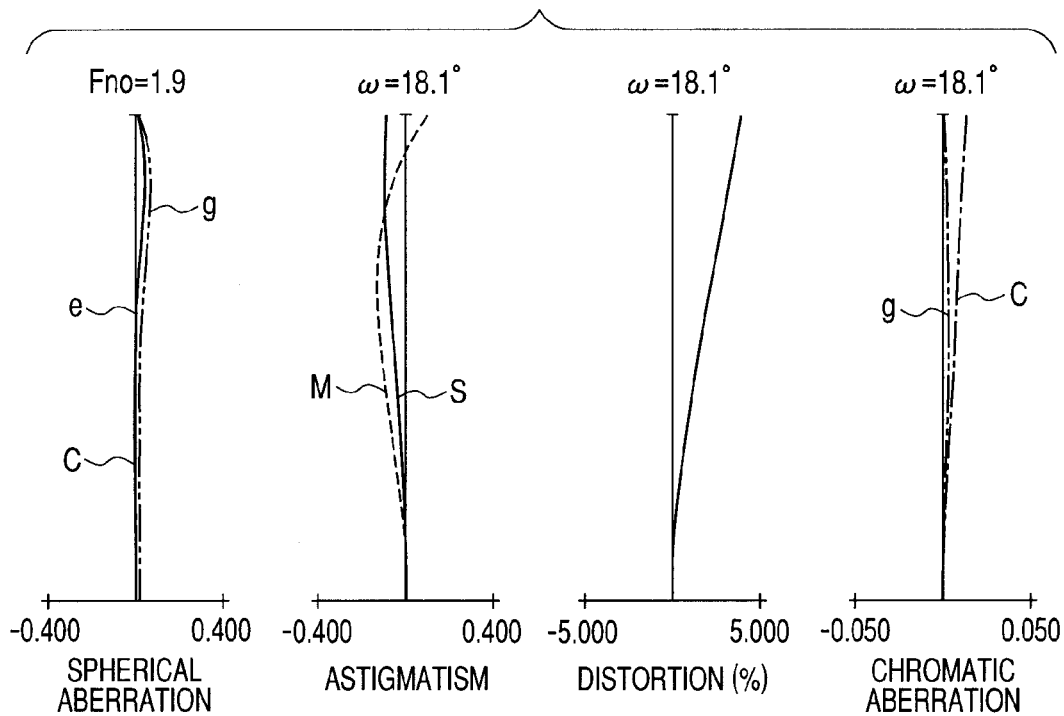
Figure 8C:
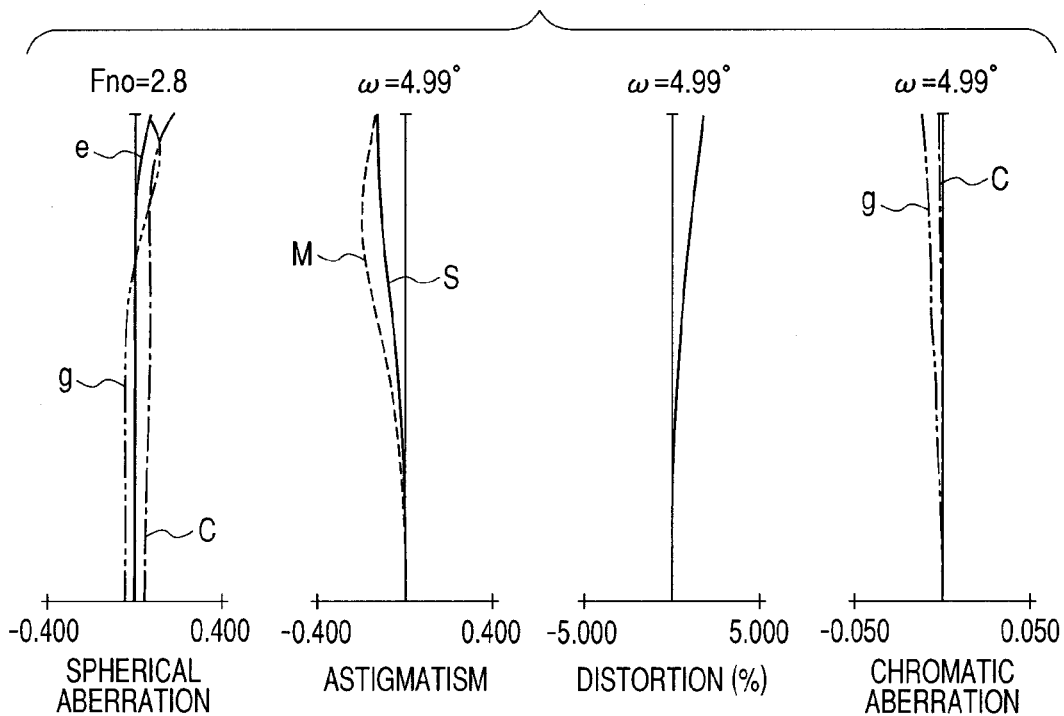
Figure 9:
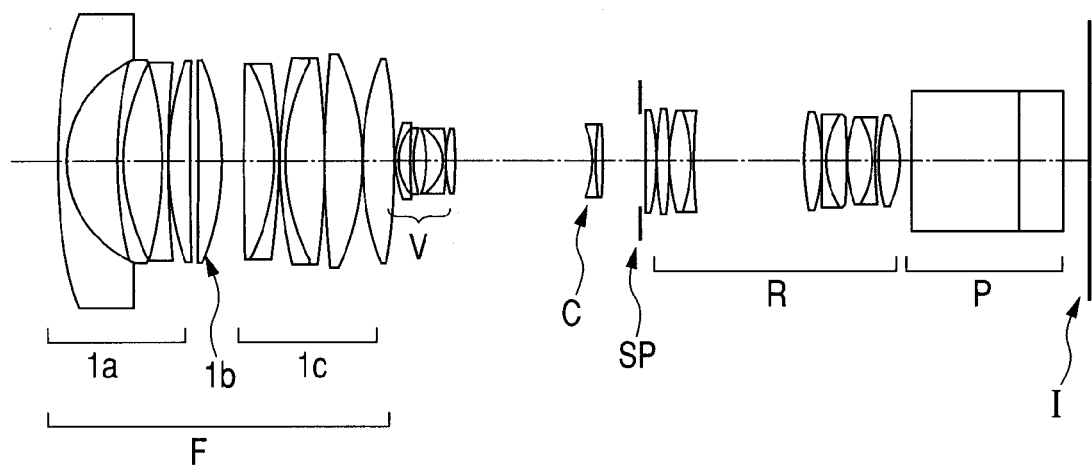
FIG. 9 is a cross sectional view of a zoom lens according to numerical embodiment 5 at the wide angle end.
Figure 10A:
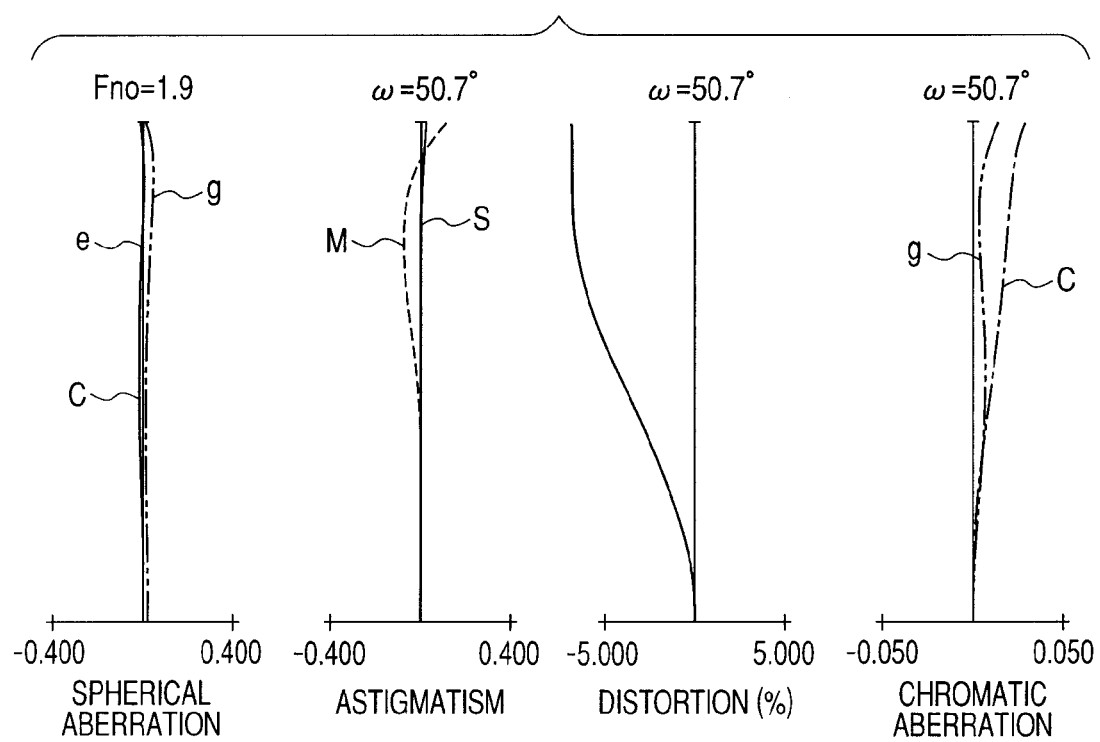

FIG. 1 is a cross sectional view of a zoom lens according to a first embodiment of the present invention or numerical embodiment 1 at the wide angle end. FIGS. 2A, 2B, and 2C show aberrations in numerical embodiment 1 respectively at the wide angle end (f=4.5 mm), at an intermediate zoom position (f=16.8 mm), and at the telephoto end (f=63.00 mm), where f is the focal length. FIG. 3 is a cross sectional view of a zoom lens according to a second embodiment of the present invention or numerical embodiment 2 at the wide angle end. FIGS. 4A, 4B, and 4C show aberrations in numerical embodiment 2 respectively at the wide angle end (f=3.85 mm), at an intermediate zoom position (f=14.4 mm), and at the telephoto end (f=53.90 mm). FIG. 5 is a cross sectional view of a zoom lens according to a third embodiment of the present invention or numerical embodiment 3 at the wide angle end. FIGS. 6A, 6B, and 6C show aberrations in numerical embodiment 3 respectively at the wide angle end (f=5.50 mm), at an intermediate zoom position (f=18.6 mm), and at the telephoto end (f=63.00 mm). FIG. 7 is a cross sectional view of a zoom lens according to a fourth embodiment of the present invention or numerical embodiment at the wide angle end. FIGS. 8A, 8B, and 8C show aberrations in numerical embodiment 4 respectively at the wide angle end (f=4.50 mm), at an intermediate zoom position (f=16.8 mm), and at the telephoto end (f=63.00 mm). FIG. 9 is a cross sectional view of a zoom lens according to a fifth embodiment of the present invention or numerical embodiment 5 at the wide angle end. FIGS. 10A, 10B, and 10C show aberrations in numerical embodiment 5 respectively at the wide angle end (f=4.50 mm), at an intermediate zoom position (f=16.8 mm), and at the telephoto end (f=63.00 mm).

As shown in the cross sectional views of the zoom lenses, each zoom lens has a front lens unit (first unit or first lens unit) F having a positive refractive power. The first lens unit F includes partial units $1a$, $1b$, and $1c$. The partial unit $1a$ (front side partial unit) in the first lens unit F is a fixed (or stationary) unit having a negative refractive power that is disposed closest to the object side in the first lens unit F. The partial unit $1b$ (movable partial unit) in the first lens unit is a unit having a positive refractive power that is used for focusing. The partial unit $1c$ (rear side partial unit) in the first lens unit F is a fixed unit having a positive refractive power. Each zoom lens also has a variator (second unit or second lens unit) V having a negative refractive power used for changing magnification. The variator (second lens unit) V is moved along the optical axis monotonously toward the image side to provide magnification change (or zooming) from the wide angle end to the telephoto end. Each zoom lens also has a compensator (third unit or third lens unit) C having a negative refractive power. The compensator (third lens unit) C is moved along the optical axis non-linearly to compensate variations of the image plane during zooming. The variator V and the compensator C constitute the magnification changing system of the zoom lens. Each zoom lens also has a stop (aperture stop) SP, a relay unit (fourth unit or fourth lens unit) R. The relay unit (fourth lens unit) R is a fixed unit having a positive refractive power that provides imaging effect. The cross sectional views also show a glass block P, which may be a color separating prism or an optical filter etc, and the image plane I at which an image pickup element is disposed.

In the zoom lenses according to the embodiments, second-order spectrum of longitudinal chromatic aberration at the telephoto end is favorably corrected by appropriately designing the lens configuration of the partial unit (rear side partial unit) $1c$ in the first unit F and by specifying conditions such as partial dispersion ratios of the materials of the lenses in the partial unit $1c$. In the zoom lenses according to the embodiments, the rear side partial unit $1c$ includes a plurality of positive lenses and one or more negative lenses. The partial unit $1c$ satisfies the following conditions:

$$-1.2 \times 10^{-3} < (\theta pa - \theta n)/(\nu pa - \nu n) \quad (1), \text{ and}$$

$$\nu n < 30 \quad (2),$$

where νn is the Abbe number of the material of the negative lens Gn that has the smallest Abbe number among the one or more negative lenses in the rear side partial unit $1c$, θn is the partial dispersion ratio of this negative lens Gn, νpa is the average of the Abbe numbers ν of the materials of the plurality of positive lenses in the rear side partial unit $1c$, and θpa is the average of the partial dispersion ratios θ of the materials of the plurality of positive lenses in the rear side partial unit $1c$. Conditional expression (1) specifies a condition for decreasing residual second-order spectrum of longitudinal chromatic aberration in the rear side partial unit to appropriately correct secondary-spectrum of longitudinal chromatic aberration at the telephoto end.

Figure 11:
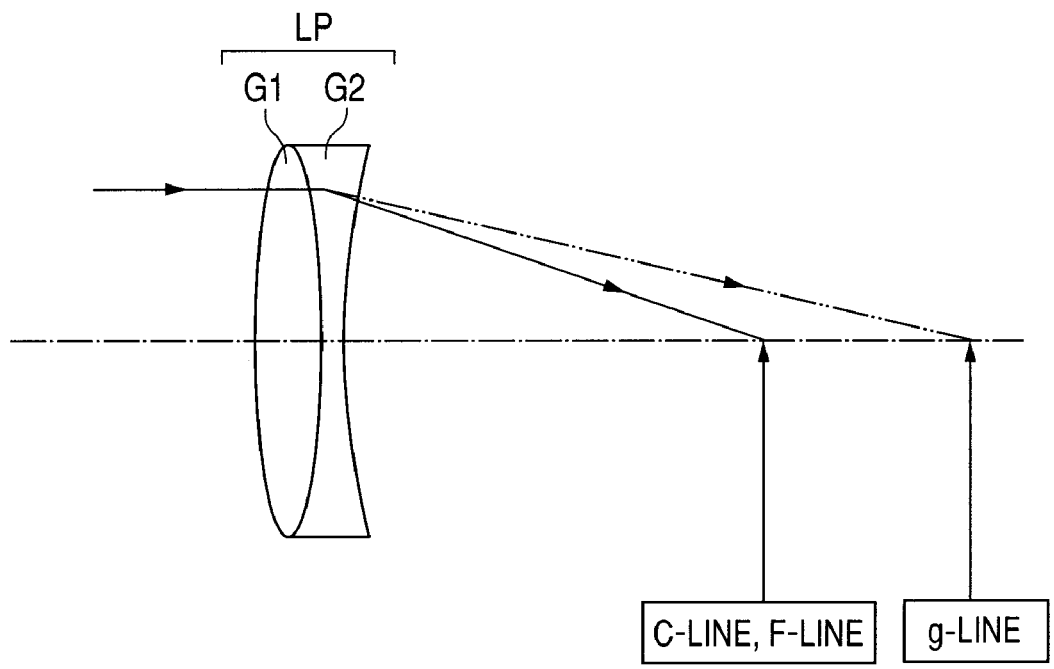
FIG. 11 is a diagram schematically shows achromatization with respect to two colors in a lens having a positive refractive power and residual second-order spectrum.
Figure 12:
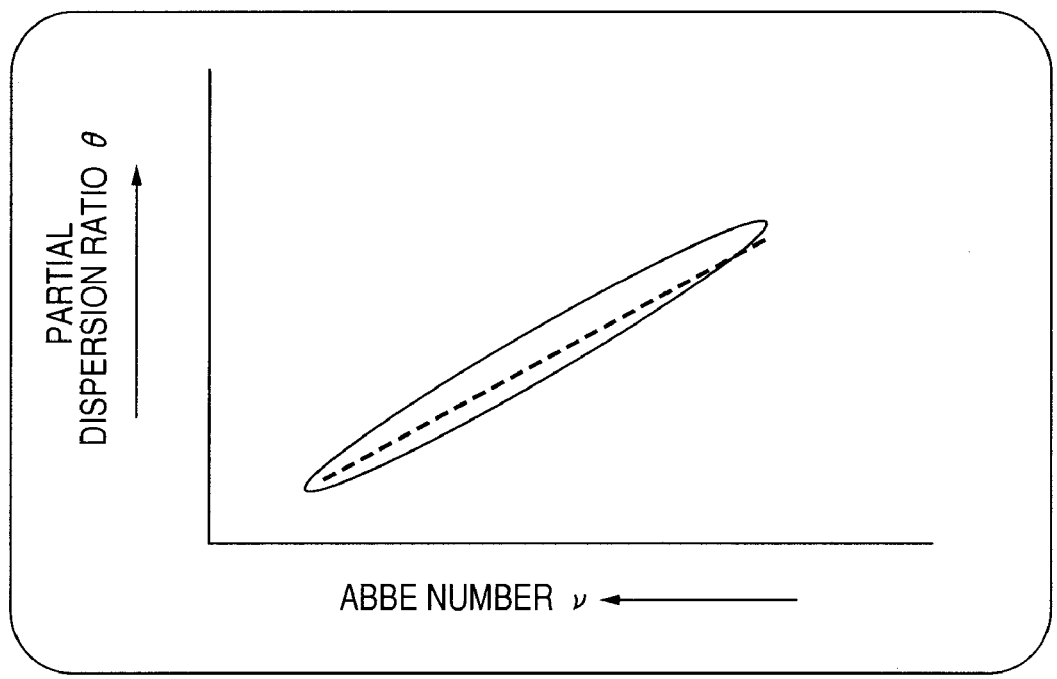
FIG. 12 is a diagram schematically shows distribution of Abbe numbers ν and partial dispersion ratios θ of optical materials.

In the following, second-order spectrum will be described in connection with the above conditional expressions. FIG. 11 schematically shows achromatization with respect to two colors and residual second-order spectrum in a lens unit L1 having a positive refractive power L1. FIG. 12 schematically shows distribution of the Abbe numbers ν and the partial dispersion ratios θ of existing optical materials. The Abbe number ν and the partial dispersion ratio θ are defined by the following equations:

$$\theta = (Nd-1)/(NF-NC) \quad (10), \text{ and}$$

$$\theta = (Ng-NF)/(NF-NC) \quad (11),$$

where Ng is the refractive index for the g-line, NF is the refractive index for the F-line, Nd is the refractive index for the d-line, and NC is the refractive index for the C-line. As shown in FIG. 12, in the existing optical materials, the variation of the partial dispersion ratio θ for each Abbe number ν is small, and the smaller the Abbe number ν is, the larger that partial dispersion ratio θ tends to be. Here, it is assumed that the lens unit L1 has a specific positive refractive power φ, and the lens unit L1 is composed of two lenses G1 and G2. Let φ1 and φ2 be the refractive powers of the two lenses G1 and G2 respectively, and ν1 and ν2 be the Abbe numbers of the materials of the lenses G1 and G2 respectively. Then, a condition for correcting chromatic aberration in the thin lens system composed of these two lenses G1, G2 is expressed by the following equation:

$$\varphi 1/\nu 1 + \varphi 2/\nu 2 = 0 \quad (12).$$

Here, the following equation holds:

$$\varphi = \varphi 1 + \varphi 2 \quad (13).$$

When the equation (12) holds, the imaging positions of the beams of the C-line and the F-line coincide with each other as shown in FIG. 11. If this is the case, the refractive powers φ1, φ2 are expressed by the following equations:

$$\varphi 1 = \varphi \cdot \nu 1/(\nu 1 - \nu 2) \quad (14), \text{ and}$$

$$\varphi 2 = -\varphi \cdot \nu 2/(\nu 1 - \nu 2) \quad (15).$$

In the case shown in FIG. 11, for the sake of achromatization in the lens unit L1 having a positive refractive power, a material having a large Abbe number ν1 is used for the positive lens G1, and a material having a small Abbe number ν2 is used for the negative lens G2. Therefore, as seen from FIG. 12, the positive lens G1 has a small partial dispersion ratio θ1, and the negative lens G2 has a large partial dispersion ratio ν2. Thus, when achromatization is performed for the F-line and the C-line, the imaging point of the g-line shifts toward the image side. Here, a second-order spectrum amount Δ is defined to be this shift. The second-order spectrum amount Δ is expressed by the following equation:

$$\Delta = -(1/\varphi) \cdot (\theta 1 - \theta 2)/(\nu 1 - \nu 2) \quad (16).$$

Here, let Δ1a, Δ1b, Δ1c, Δ2, Δ3, and Δ4 be the second-order spectrum amounts of the front side partial unit 1a in the first unit F, the movable partial unit 1b in the first unit F, the rear side partial unit 1c in the first unit F, the second unit V, the third unit C and the fourth unit R respectively. Let β1b, β1c, β2, β3, β4 be the imaging magnifications of the movable partial unit 1b, the rear side partial unit 1c, the second unit V, the third unit C, and the fourth unit R respectively.

Then, the second-order spectrum amount Δ in the entire lens system is expressed by the following equation:

$$\Delta = \Delta 1a \cdot \beta 1b^2 \cdot \beta 1c^2 \cdot \beta 2^2 \cdot \beta 3^2 \cdot \beta 4^2 + \quad (17)$$

$$\Delta 1b \cdot (1-\beta 1b) \cdot \beta 1c^2 \cdot \beta 2^2 \cdot \beta 3^2 \cdot \beta 4^2 +$$

-continued $$\Delta 1c \cdot (1-\beta 1c) \cdot \beta 2^2 \cdot \beta 3^2 \cdot \beta 4^2 + \Delta 2 \cdot (1-\beta 2) \cdot \beta 3^3 \cdot \beta 4^2 +$$

$$\Delta 3 \cdot (1-\beta 3) \cdot \beta 4^2, \text{ and } +\Delta 4 \cdot (1-\beta 4).$$

The second-order spectrum Δ is generated dominantly by the rear side partial unit 1c in which on-axis marginal rays pass at high positions when the zoom lens is set to zoom positions near the telephoto end. Therefore, second-order spectrum Δ at zoom positions near the telephoto end can be decreased by reducing the second-order spectrum amount Δ1c of longitudinal chromatic aberration generated in the rear side partial unit 1c.

Conditional expression (1) specifies a condition for reducing second-order spectrum Δ at zoom positions near the telephoto end in this respect. If the upper limit of conditional expression (1) is exceeded, second-order spectrum generated in the rear side partial unit 1c will increase, leading to a difficulty in achieving good correction of longitudinal chromatic aberration at the telephoto end. Conditional expression (2) specifies a condition concerning the Abbe number of the negative lens Gn among the lenses that constitute the rear side partial unit 1c, which effectively contributes in particular to the generation of second-order spectrum in the rear side partial unit 1c. If the upper limit of conditional expression (2) is exceeded, the refractive power of the negative lens Gn in the rear side partial unit 1c will become large. This leads to a difficulty in correcting aberrations, in particular spherical aberration and coma, generated in the rear side partial unit 1c at the telephoto end.

It is more preferred that the numerical ranges of conditional expressions (1) and (2) be further limited as follows:

$$-1.2 \times 10^{-3} < (\theta pa - \theta n)/(\nu pa - \nu n) < -1.06 \times 10^{-3} \quad (1a), \text{ and}$$

$$22.0 < \nu n < 30 \quad (2a),$$

Furthermore, it is preferable that the following conditional expression be satisfied, $$-1.19 \times 10^{-3} < (\theta pa - \theta n)/(\nu pa - \nu n) < -1.06 \times 10^{-3} \quad (1b), \text{ and}$$

$$22.0 < \nu n < 29.5 \quad (2).$$

The zoom lenses according to the embodiments are configured as above, thereby achieving a high zoom ratio equal to or higher than 11 and a wide angle of view at the wide angle end equal to or larger than 100°. Furthermore, high optical performance is achieved with good correction of second-order spectrum of longitudinal chromatic aberration at the telephoto end. In the embodiments, zoom lenses with good aberration correction having a high zoom ratio and a wide angle of view are achieved by an appropriate design of the rear side partial unit 1c as described above. It is more preferred that one, some or all of the following conditions be further satisfied.

Let f1 be the focal length of the first unit F, fwide be the focal length of the entire system at the wide angle end, and ftele be the focal length of the entire system at the telephoto end. Let f1c be the focal length of the partial unit 1c. Let Nn be the refractive index of the material of the negative lens Gn that has the smallest Abbe number among the one or more negative lenses in the rear side partial unit 1c. Let φp be the sum of the refractive powers of the plurality of positive lenses in the rear side partial unit 1c, φn be the sum of the refractive powers of the one or more negative lenses in the rear side partial unit 1c (or the refractive power of one negative lens, if the number of negative lenses is one). Let φ1c be the refractive power of the entire rear side partial unit 1c. It is preferred that one, some or all of the following conditions be satisfied;

$$2.2 < \text{ftele}/f1 \quad (3),$$

$$1.27 < \text{ftele}/f1c \quad (4),$$

$$1.86 < Nn \quad (5),$$

$$\phi p/\phi 1c < 1.9 \quad (6),$$

$$-0.9 < \phi n/\phi 1c \quad (7), \text{ and}$$

$$11 < \text{ftele}/\text{fwide} \quad (8).$$

Conditional expression (3) limits the ratio of the focal length at the telephoto end and the focal length of the first unit F, thereby facilitating correction of longitudinal chromatic aberration while achieving a high zoom ratio.

If the focal length of the first unit F is so large that the lower limit of conditional expression (3) is exceeded, it will be difficult to achieve a high zoom ratio and compactness of the entire system. Conditional expression (4) limits the ratio of the focal length at the telephoto end and the focal length of the rear side partial unit 1c, thereby facilitating correction of longitudinal chromatic aberration while achieving a high zoom ratio. If the lower limit of conditional expression (4) is exceeded, the focal length of the first unit will increase with an increase in the focal length of the rear side partial unit 1c, leading to a difficulty in achieving a high zoom ratio and compactness of the entire system. Conditional expression (5) specifies a condition on the refractive index of the material of the negative lens Gn that has the smallest Abbe number among the lenses in the rear side partial unit 1c and contributes effectively to generation of second-order spectrum in the rear side partial unit 1c. If the lower limit of conditional expression (5) is exceeded, the curvature of the lens surfaces of the negative lens Gn will become strong, and the volume of the negative lens Gn will become large, leading to a difficulty in correcting aberrations. This consequently leads to a difficulty in achieving a high zoom ratio and compactness of the entire system. Conditional expressions (6) and (7) limits the ratio of the refractive power of the positive lenses and the refractive power of the negative lens(es) in the rear side partial unit 1c relative to the overall refractive power of the rear side partial unit 1c. If the upper limit of conditional expression (6) and the lower limit of conditional expression (7) are exceeded, the amount of second-order spectrum generated by the positive lenses and the negative lens(es) in the rear side partial unit 1c will become large, leading to a difficulty in correcting longitudinal chromatic aberration satisfactorily at the telephoto end while achieving a high zoom ratio. Conditional expression (8) limits the ratio of the focal length at the telephoto end and the focal length at the wide angle end. Conditional expression (8) specifies appropriate zoom ratios with which good correction of longitudinal chromatic aberration at the telephoto end and compactness of the zoom lens can be achieved.

It is more preferred that the numerical ranges of conditional expressions (3) to (8) be further limited as follows:

$$2.20 < \text{ftele}/f1 < 3.00 \quad (3a),$$

$$1.270 < \text{ftele}/f1c < 1.500 \quad (4a),$$

$$1.86 < Nn < 2.050 \quad (5a),$$

$$1.30 < \phi p/\phi 1c < 1.90 \quad (6a),$$

$$-0.9 < \phi n/\phi 1c < -0.2 \quad (7a), \text{ and}$$

$$11.0 < \text{ftele}/\text{fwide} < 15.0 \quad (8a).$$

It is still more preferred that the numerical ranges of conditional expressions (3) and (4) be further limited as follows:

$$2.20 < \text{ftele}/f1 < 2.50 \quad (3b), \text{ and}$$

$$1.270 < \text{ftele}/f1c < 1.320 \quad (4b)$$

$$1.865 < Nn < 2.050 \quad (5b),$$

$$1.30 < \phi p/\phi 1c < 1.80 \quad (6b),$$

$$-0.8 < \phi n/\phi 1c < -0.2 \quad (7a),$$

$$11.4 < \text{ftele}/\text{fwide} < 15.0 \quad (8b).$$

When the zoom lens according to the present invention is used in an image pickup apparatus equipped with a solid state image pickup element, it is preferred that the diagonal length IS of the image area of the solid state image pickup element satisfy the following condition:

$$0.34 < \text{fwide}/IS < 0.60 \quad (9).$$

Conditional expression (9) relates to the ratio of the focal length of the entire system at the wide angle end and the diagonal length (effective image size) of the image area of the solid state image pickup element. Conditional expression (9) appropriately limits the angle of view at the wide angle end in order to correct longitudinal chromatic aberration at the telephoto end satisfactorily and to achieve a compact zoom lens.

If the lower limit of conditional expression (9) is exceeded, the effective diameter of the front side partial unit 1a will become large, leading to a difficulty in achieving compactness of the entire system. It is more preferred that the numerical range of conditional expression (9) be further limited as follows:

$$0.345 < \text{fwide}/IS < 0.550 \quad (9a).$$

The lens configuration of the rear side partial unit 1c that constitutes a part of the first unit F in each of the embodiments will be described. The rear side partial unit 1c in the first embodiment shown in FIG. 1 includes 11th through 20th surfaces (lens surfaces) counted from the object side. The rear side partial unit 1c includes, in order from the object side to the image side, a first cemented lens made up of a positive lens and a negative lens that are cemented together, a second cemented lens made up of a negative lens and a positive lens that are cemented together, a positive lens, and a positive lens. The negative lens element at the third position from the object side in the rear side partial unit 1c is the negative lens made of the material having the smallest Abbe number in the rear side partial unit 1c. Numerical embodiment 1 corresponding to the first embodiment satisfies all the conditional expressions described above. The first embodiment provides a zoom lens that is compact in the overall size and has high optical performance with good correction of longitudinal chromatic aberration at the telephoto end while achieving a high zoom ratio of 11 or higher and a wide angle of view of 100° or larger at the wide angle end.

The rear side partial unit 1c in the second embodiment shown in FIG. 3 includes 11th through 19th surfaces counted from the object side. The rear side partial unit 1c includes, in order from the object side to the image side, a positive lens, a cemented lens made up of a negative lens and a positive lens that are cemented together, a positive lens, and a positive lens. The negative lens element at the second position from the object side in the rear side partial unit 1c is the negative lens made of the material having the smallest Abbe number in the rear side partial unit 1c. Numerical embodiment 2 corresponding to the second embodiment satisfies all the conditional expressions described above. The second embodiment provides a zoom lens that is compact in the overall size and has high optical performance with good correction of longitudinal chromatic aberration at the telephoto end while achieving a high zoom ratio of 11 or higher and a wide angle of view of 100° or larger at the wide angle end.

The rear side partial unit 1c in the third embodiment shown in FIG. 5 includes 11th through 20th surfaces counted from the object side. The rear side partial unit 1c includes, in order from the object side to the image side, a first cemented lens made up of a positive lens and a negative lens that are cemented together, a second cemented lens made up of a negative lens and a positive lens that are cemented together, a positive lens, and a positive lens. The negative lens element at the third position from the object side in the rear side partial unit 1c is the negative lens made of the material having the smallest Abbe number in the rear side partial unit 1c. Numerical embodiment 3 corresponding to the third embodiment satisfies all the conditional expressions described above. The third embodiment provides a zoom lens that is compact in the overall size and has high optical performance with good correction of longitudinal chromatic aberration at the telephoto end while achieving a high zoom ratio of 11 or higher and a wide angle of view of 90° or larger at the wide angle end.

The rear side partial unit 1c in the fourth embodiment shown in FIG. 7 includes 14th through 22th surfaces counted from the object side. The rear side partial unit 1c includes, in order from the object side to the image side, a cemented lens made up of a negative lens and a positive lens that are cemented together, a positive lens, a positive lens, and a positive lens. The negative lens element at the first position from the object side in the rear side partial unit 1c is the negative lens made of the material having the smallest Abbe number in the rear side partial unit 1c. Numerical embodiment 4 corresponding to the fourth embodiment satisfies all the conditional expressions described above. The fourth embodiment provides a zoom lens that is compact in the overall size and has high optical performance with good correction of longitudinal chromatic aberration at the telephoto end while achieving a high zoom ratio of 11 or higher and a wide angle of view of 100° or larger at the wide angle end.

The rear side partial unit 1c in the fifth embodiment shown in FIG. 9 includes 11th through 20th surfaces counted from the object side. The rear side partial unit 1c includes, in order from the object side to the image side, a first cemented lens made up of a positive lens and a negative lens that are cemented together, a second cemented lens made up of a negative lens and a positive lens that are cemented together, a positive lens, and a positive lens. The negative lens element at the third position from the object side in the rear side partial unit 1c is the negative lens made of the material having the smallest Abbe number in the rear side partial unit 1c. Numerical embodiment 5 corresponding to the fifth embodiment satisfies all the conditional expressions described above. The fifth embodiment provides a zoom lens that is compact in the overall size and has high optical performance with good correction of longitudinal chromatic aberration at the telephoto end while achieving a high zoom ratio of 11 or higher and a wide angle of view of 100° or larger at the wide angle end.

The configuration of the movable partial unit (partial unit) 1b for focusing that constitutes a part of the first unit F in the embodiments are as follows. In the first, second, third, and fifth embodiments shown in FIGS. 1, 3, 5, and 9, the movable partial unit 1b is composed of a single positive lens. In the fourth embodiment shown in FIG. 7, the movable partial unit 1b is composed of a positive lens and a cemented lens made up of a positive lens and a negative lens that are cemented together. In all the embodiments, the front side partial unit (partial unit) 1a that constitutes a part of the first unit F is composed of two negative meniscus lenses, a negative lens, and a positive lens.

In the following, numerical embodiments 1 to 5 corresponding to the first to fifth embodiments of the present invention will be described. In the tables of the numerical embodiments, there are presented the surface number i counted from the object side, the radius of curvature ri of the i-th surface counted from the object side, the distance di between the i-th surface and the (i+1)-th surface counted from the object side, the refractive index nd of the corresponding i-th optical member, the Abbe number vd of the corresponding i-th optical member, the effective diameter ED of each optical member, and the focal length FL of each optical member. The values of the focal length, the F-number, and the angle of view presented in the numerical embodiments are for the state in which the zoom lenses of the numerical embodiments are focused on an object at infinity. The back focus "BF" is the distance from the last lens surface to the image plane represented by the equivalent air distance. The last three surfaces are surfaces of glass blocks such as filters. There also are presented aspheric coefficients A3 to A12. An aspheric surface is expressed by the following equation in terms of displacement (or distance) X from the surface vertex as the reference point in the direction parallel to the optical axis at height H from the optical axis:

$$X = \frac{(1/R)H^2}{1\sqrt{1-(1+K)(H/R)^2}} + A3 \cdot H^3 + A4 \cdot H^4 + A5 \cdot H^5 + A6 \cdot H^6 + A7 \cdot H^7 + A8 \cdot H^8 + A9 \cdot H^9 + A10 \cdot H^{10} + A11 \cdot H^{11} + A12 \cdot H^{12}$$

where R is the paraxial radius of curvature, K is the conic constant. The expression "e-0X" stands for "$\times 10^{-X}$". The relation between the above-described conditional expressions and the numerical embodiments will be seen in Table 1.

(Numerical Embodiment 1)

| i | r | d | nd | vd | θgF | ED | FL |
|---|---|---|---|---|---|---|---|
| 1 | 497.51526 | 2.50000 | 1.772500 | 49.50 | 0.5519 | 83.019 | −44.307 |
| 2 | 32.09747 | 15.34143 | 1.000000 | 0.00 | 0.0000 | 58.195 | 0.000 |
| 3 | 117.40597 | 1.85000 | 1.772500 | 49.50 | 0.5519 | 57.990 | −160.549 |
| 4 | 60.03632 | 11.92200 | 1.000000 | 0.00 | 0.0000 | 55.522 | 0.000 |
| 5 | −102.03281 | 1.75000 | 1.772500 | 49.50 | 0.5519 | 55.404 | −98.137 |
| 6 | 302.83186 | 0.15000 | 1.000000 | 0.00 | 0.0000 | 56.743 | 0.000 |
| 7 | 87.76084 | 6.56957 | 1.805150 | 25.50 | 0.6156 | 58.712 | 127.012 |

-continued

| | | | | | | | |
|---|---|---|---|---|---|---|---|
| 8 | 566.61117 | 2.57475 | 1.000000 | 0.00 | 0.0000 | 58.580 | 0.000 |
| 9 | 3483.26414 | 7.13203 | 1.603112 | 60.64 | 0.5414 | 58.538 | 130.345 |
| 10 | −80.68906 | 7.26670 | 1.000000 | 0.00 | 0.0000 | 58.503 | 0.000 |
| 11 | 707.15570 | 8.89740 | 1.438750 | 94.99 | 0.5342 | 55.798 | 132.528 |
| 12 | −63.28583 | 1.65000 | 1.654115 | 39.70 | 0.5737 | 55.751 | −183.210 |
| 13 | −134.59681 | 0.15000 | 1.000000 | 0.00 | 0.0000 | 56.894 | 0.000 |
| 14 | 116.12008 | 1.65000 | 1.882210 | 23.78 | 0.6036 | 59.734 | −159.227 |
| 15 | 63.42628 | 11.85375 | 1.438750 | 94.99 | 0.5342 | 59.576 | 121.080 |
| 16 | −313.22558 | 0.18000 | 1.000000 | 0.00 | 0.0000 | 60.492 | 0.000 |
| 17 | 217.69179 | 12.10741 | 1.496999 | 81.54 | 0.5375 | 61.883 | 109.307 |
| 18 | −71.32910 | 0.18000 | 1.000000 | 0.00 | 0.0000 | 62.265 | 0.000 |
| 19 | 82.77703 | 8.50249 | 1.592400 | 68.30 | 0.5456 | 58.656 | 113.420 |
| 20 | −349.58745 | variable | 1.000000 | 0.00 | 0.0000 | 57.773 | 0.000 |
| 21 | 28.05654 | 0.75000 | 1.882997 | 40.76 | 0.5667 | 21.224 | −30.060 |
| 22 | 13.50815 | 3.69929 | 1.000000 | 0.00 | 0.0000 | 18.360 | 0.000 |
| 23 | 177.13253 | 0.75000 | 1.834000 | 37.16 | 0.5775 | 18.083 | −39.648 |
| 24 | 27.96059 | 3.88668 | 1.000000 | 0.00 | 0.0000 | 17.184 | 0.000 |
| 25 | −30.52153 | 5.09071 | 1.784723 | 25.68 | 0.6161 | 16.710 | 18.027 |
| 26 | −10.44340 | 0.80000 | 1.882997 | 40.76 | 0.5667 | 16.841 | −14.034 |
| 27 | −66.74005 | 0.13706 | 1.000000 | 0.00 | 0.0000 | 17.697 | 0.000 |
| 28 | 45.66845 | 2.43724 | 1.592701 | 35.31 | 0.5933 | 17.897 | 53.971 |
| 29 | −107.03858 | variable | 1.000000 | 0.00 | 0.0000 | 17.823 | 0.000 |
| 30 | −26.74621 | 0.75000 | 1.740999 | 52.64 | 0.5467 | 18.189 | −23.566 |
| 31 | 51.58216 | 2.26114 | 1.808095 | 22.76 | 0.6307 | 19.600 | 49.466 |
| 32 | −182.39114 | variable | 1.000000 | 0.00 | 0.0000 | 20.014 | 0.000 |
| 33 | 0.00000 | 1.40000 | 1.000000 | 0.00 | 0.0000 | 27.356 | 0.000 |
| 34 | 542.88958 | 3.08868 | 1.720000 | 43.69 | 0.5699 | 28.377 | 75.555 |
| 35 | −60.67748 | 0.15000 | 1.000000 | 0.00 | 0.0000 | 28.773 | 0.000 |
| 36 | 73.99391 | 3.90770 | 1.639999 | 60.07 | 0.5372 | 29.550 | 65.848 |
| 37 | −96.76937 | 0.22000 | 1.000000 | 0.00 | 0.0000 | 29.522 | 0.000 |
| 38 | 55.91255 | 6.24462 | 1.516330 | 64.14 | 0.5352 | 28.754 | 46.913 |
| 39 | −41.37922 | 1.00000 | 1.882997 | 40.76 | 0.5667 | 28.112 | −33.537 |
| 40 | 107.51631 | 34.00000 | 1.000000 | 0.00 | 0.0000 | 27.595 | 0.000 |
| 41 | 71.70949 | 5.19718 | 1.567322 | 42.80 | 0.5730 | 27.756 | 51.159 |
| 42 | −47.91739 | 0.30000 | 1.000000 | 0.00 | 0.0000 | 27.501 | 0.000 |
| 43 | −696.89119 | 1.00000 | 1.882997 | 40.76 | 0.5667 | 26.161 | −23.663 |
| 44 | 21.68388 | 6.16444 | 1.516330 | 64.14 | 0.5352 | 24.694 | 36.921 |
| 45 | −146.96232 | 0.20000 | 1.000000 | 0.00 | 0.0000 | 24.617 | 0.000 |
| 46 | 34.21408 | 7.74204 | 1.516330 | 64.14 | 0.5352 | 24.216 | 28.048 |
| 47 | −23.32121 | 1.00000 | 1.882997 | 40.76 | 0.5667 | 23.798 | 20.363 |
| 48 | 82.17483 | 0.87964 | 1.000000 | 0.00 | 0.0000 | 24.249 | 0.000 |
| 49 | 45.55541 | 6.21162 | 1.516330 | 64.14 | 0.5352 | 25.024 | 37.441 |
| 50 | −32.22841 | 4.00000 | 1.000000 | 0.00 | 0.0000 | 25.183 | 0.000 |
| 51 | 0.00000 | 33.00000 | 1.608590 | 46.44 | 0.5664 | 23.040 | 0.000 |
| 52 | 0.00000 | 13.20000 | 1.516800 | 64.17 | 0.5347 | 16.405 | 0.000 |
| 53 | 0.00000 | 0.00000 | 1.000000 | 0.00 | 0.0000 | 13.587 | 0.000 |

Aspheric Surface Data

1st surface

K = 1.22038e+002  A4 = 2.53837e−006  A6 = −2.87657e−010
A8 = −2.07660e−013  A10 = −1.06570e−016  A12 = 1.95302e−020
A3 = −3.54481e−006  A5 = −3.22306e−008  A7 = 8.19704e−012
A9 = 1.05404e−014  A11 = −2.16883e−018

10th surface

K = 1.40399e+000  A4 = 7.52699e−007  A6 = −4.30444e−010
A8 = −3.69752e−013  A10 = 9.22352e−016  A12 = −2.33283e−019
A3 = 9.93207e−007  A5 = 2.14919e−008  A7 = −5.88837e−012
A9 = −1.27999e−014  A11 = −1.61555e−018

13th surface

K = −5.71530e+000  A4 = 5.22731e−007  A6 = 2.51200e−010
A8 = 3.97465e−013  A10 = −2.87988e−016  A12 = 2.93855e−019
A3 = −8.98702e−007  A5 = −9.12604e−009  A7 = 8.80536e−012
A9 = −4.36901e−015  A11 = −6.20847e−018

Various Data
zoom ratio 14.00

| | wide angle | intermediate | telephoto |
|---|---|---|---|
| focal length | 4.50 | 16.83 | 63.00 |
| F-number | 1.90 | 1.90 | 2.80 |
| half view angle | 50.71 | 18.10 | 4.99 |
| image height | 5.50 | 5.50 | 5.50 |
| full lens length | 313.23 | 313.23 | 313.23 |
| BF | 7.90 | 7.90 | 7.90 |
| d20 | 0.46 | 31.36 | 44.52 |

-continued

| | | | |
|---|---|---|---|
| d29 | 41.48 | 7.43 | 8.07 |
| d32 | 11.70 | 14.85 | 1.05 |
| d53 | 7.90 | 7.90 | 7.90 |
| entrance P | 31.73 | 52.85 | 103.97 |
| exit p | 452.73 | 452.73 | 452.73 |
| front pp | 36.28 | 70.32 | 175.89 |
| rear pp | 3.40 | −8.93 | −55.10 |

(In the above table, "entrance p" refers to the position of the entrance pupil, "exit p" refers to the position of the exit pupil, "front pp" refers to the position of the front principal point, and "rear pp" refers to the position of the rear principal point. These abbreviations also apply to similar tables for numerical embodiments 2 to 5 presented in the following.)

Zoom Lens Unit Data

| unit | FS | FL | LUL | front pp | rear pp |
|---|---|---|---|---|---|
| 1 | 1 | 27.10 | 102.23 | 43.82 | 36.91 |
| 2 | 21 | −17.40 | 17.55 | 0.89 | −13.92 |
| 3 | 30 | −46.00 | 3.01 | −0.37 | −2.06 |
| 4 | 33 | 58.06 | 128.91 | 64.63 | −118.38 |

(In the above table, "FS" refers to the surface number of the first surface or the surface closest to the object side in each unit, "FL" refers to the focal length of each unit, "LUL" refers to the physical length of each unit, "front pp" refers to the position of the front principal point, and "rear pp" refers to the position of the rear principal point. These abbreviations also apply to similar tables for numerical embodiments 2 to 5 presented in the following.)

(Numerical Embodiment 2)

| i | r | d | nd | νd | θgF | ED | FL |
|---|---|---|---|---|---|---|---|
| 1 | 148.91537 | 2.25000 | 1.882997 | 40.76 | 0.5667 | 88.950 | −46.311 |
| 2 | 32.00033 | 17.20243 | 1.000000 | 0.00 | 0.0000 | 61.064 | 0.000 |
| 3 | 85.79575 | 1.80000 | 1.772500 | 49.50 | 0.5519 | 60.761 | −139.986 |
| 4 | 47.50200 | 15.49710 | 1.000000 | 0.00 | 0.0000 | 56.247 | 0.000 |
| 5 | −81.25871 | 1.70000 | 1.772500 | 49.50 | 0.5519 | 55.714 | −69.201 |
| 6 | 159.91592 | 0.13500 | 1.000000 | 0.00 | 0.0000 | 56.703 | 0.000 |
| 7 | 82.55361 | 5.74046 | 1.805150 | 25.50 | 0.6156 | 58.135 | 133.156 |
| 8 | 337.40325 | 2.50702 | 1.000000 | 0.00 | 0.0000 | 57.993 | 0.000 |
| 9 | 461.78735 | 5.83074 | 1.603112 | 60.64 | 0.5414 | 58.286 | 164.508 |
| 10 | −126.39592 | 4.71717 | 1.000000 | 0.00 | 0.0000 | 58.858 | 0.000 |
| 11 | 184.51952 | 7.47208 | 1.438750 | 94.99 | 0.5342 | 61.546 | 141.031 |
| 12 | −92.29319 | 0.13500 | 1.000000 | 0.00 | 0.0000 | 61.679 | 0.000 |
| 13 | 113.83160 | 1.70000 | 1.882210 | 23.78 | 0.6036 | 62.610 | −133.387 |
| 14 | 57.73227 | 14.45540 | 1.438750 | 94.99 | 0.5342 | 61.756 | 95.502 |
| 15 | −142.42453 | 0.16200 | 1.000000 | 0.00 | 0.0000 | 62.217 | 0.000 |
| 16 | 199.25496 | 12.93464 | 1.496999 | 81.54 | 0.5375 | 62.986 | 97.459 |
| 17 | −62.85393 | 0.16200 | 1.000000 | 0.00 | 0.0000 | 62.940 | 0.000 |
| 18 | 96.17157 | 6.29833 | 1.592400 | 68.30 | 0.5456 | 53.929 | 156.081 |
| 19 | −2569.66378 | variable | 1.000000 | 0.00 | 0.0000 | 52.382 | 0.000 |
| 20 | 58.65986 | 0.90000 | 1.882997 | 40.76 | 0.5667 | 22.613 | −27.896 |
| 21 | 17.29298 | 3.71131 | 1.000000 | 0.00 | 0.0000 | 19.490 | 0.000 |
| 22 | −126.78459 | 0.90000 | 1.834000 | 37.16 | 0.5775 | 19.181 | −29.443 |
| 23 | 30.79447 | 2.62551 | 1.000000 | 0.00 | 0.0000 | 18.174 | 0.000 |
| 24 | −173.36127 | 6.03826 | 1.784723 | 25.68 | 0.6161 | 17.979 | 15.538 |
| 25 | −11.66587 | 0.90000 | 1.882997 | 40.76 | 0.5667 | 17.853 | −14.271 |
| 26 | −151.85845 | 0.12819 | 1.000000 | 0.00 | 0.0000 | 18.160 | 0.000 |
| 27 | 35.71912 | 2.17651 | 1.592701 | 35.31 | 0.5933 | 18.183 | 72.005 |
| 28 | 207.02341 | variable | 1.000000 | 0.00 | 0.0000 | 17.961 | 0.000 |
| 29 | −26.27977 | 0.80000 | 1.740999 | 52.64 | 0.5467 | 17.166 | −22.039 |
| 30 | 44.22241 | 2.19602 | 1.808095 | 22.76 | 0.6307 | 18.520 | 49.933 |
| 31 | −510.04731 | variable | 1.000000 | 0.00 | 0.0000 | 18.952 | 0.000 |
| 32 | 0.00000 | 1.40000 | 1.000000 | 0.00 | 0.0000 | 27.098 | 0.000 |
| 33 | 4615.65877 | 2.98519 | 1.723420 | 37.95 | 0.5836 | 28.080 | 79.424 |
| 34 | −58.53296 | 0.15000 | 1.000000 | 0.00 | 0.0000 | 28.538 | 0.000 |
| 35 | 63.01824 | 4.46957 | 1.639999 | 60.07 | 0.5372 | 29.626 | 55.226 |
| 36 | −78.96423 | 0.22000 | 1.000000 | 0.00 | 0.0000 | 29.608 | 0.000 |
| 37 | 56.57823 | 6.76527 | 1.516330 | 64.14 | 0.5352 | 28.656 | 45.776 |
| 38 | −39.18587 | 1.00000 | 1.882997 | 40.76 | 0.5667 | 27.805 | −32.587 |
| 39 | 112.03673 | 34.00000 | 1.000000 | 0.00 | 0.0000 | 27.247 | 0.000 |
| 40 | 68.23275 | 5.15077 | 1.567322 | 42.80 | 0.5730 | 26.444 | 53.123 |
| 41 | −53.02455 | 0.30000 | 1.000000 | 0.00 | 0.0000 | 26.093 | 0.000 |
| 42 | 521.27243 | 1.00000 | 1.882997 | 40.76 | 0.5667 | 24.895 | −20.258 |
| 43 | 17.37609 | 6.40031 | 1.516330 | 64.14 | 0.5352 | 23.201 | 32.251 |
| 44 | −383.71550 | 0.20000 | 1.000000 | 0.00 | 0.0000 | 23.229 | 0.000 |
| 45 | 32.63023 | 7.45733 | 1.516330 | 64.14 | 0.5352 | 23.210 | 28.636 |

-continued

| | | | | | | | |
|---|---|---|---|---|---|---|---|
| 46 | −25.09727 | 1.00000 | 1.882997 | 40.76 | 0.5667 | 22.518 | −21.948 |
| 47 | 88.93537 | 0.87964 | 1.000000 | 0.00 | 0.0000 | 22.499 | 0.000 |
| 48 | 39.08867 | 6.24935 | 1.487490 | 70.23 | 0.5300 | 22.916 | 35.153 |
| 49 | −29.08824 | 4.00000 | 1.000000 | 0.00 | 0.0000 | 22.792 | 0.000 |
| 50 | 0.00000 | 33.00000 | 1.608590 | 46.44 | 0.5664 | 40.000 | 0.000 |
| 51 | 0.00000 | 13.20000 | 1.516800 | 64.17 | 0.5347 | 40.000 | 0.000 |
| 52 | 0.00000 | 0.00000 | 1.000000 | 0.00 | 0.0000 | 40.000 | 0.000 |

Aspheric Surface Data

1st surface

| | | |
|---|---|---|
| K = 5.31002e+000 | A4 = 3.43635e−006 | A6 = −2.83495e−010 |
| A8 = −3.90687e−013 | A10 = −9.82135e−018 | A3 = −2.93410e−005 |
| A5 = −3.55248e−008 | A7 = 1.32522e−011 | A9 = 5.61324e−015 |

10th surface

| | | |
|---|---|---|
| K = 3.49649e+000 | A4 = 9.99447e−007 | A6 = −6.51519e−010 |
| A8 = 1.82958e−013 | A10 = 2.76247e−015 | A12 = −3.20070e−019 |
| A3 = −5.59360e−006 | A5 = 2.47649e−008 | A7 = −8.00307e−012 |
| A9 = −5.68842e−014 | A11 = −2.36423e−017 | |

12th surface

| | | |
|---|---|---|
| K = −3.77482e+000 | A4 = 1.13718e−006 | A6 = −1.26652e−010 |
| A8 = 1.09170e−012 | A10 = −7.16665e−016 | A12 = 5.52685e−019 |
| A3 = 1.41681e−006 | A5 = −2.34451e−010 | A7 = 2.21313e−011 |
| A9 = −1.02645e−014 | A11 = −1.25994e−017 | |

Various Data
zoom ratio 14.00

| | wide angle | intermediate | telephoto |
|---|---|---|---|
| focal length | 3.85 | 14.40 | 53.90 |
| F-number | 1.89 | 1.89 | 2.77 |
| half view angle | 55.01 | 20.91 | 5.83 |
| image height | 5.50 | 5.50 | 5.50 |
| full lens length | 312.71 | 312.71 | 312.71 |
| BF | 6.64 | 6.64 | 6.64 |
| d19 | 0.46 | 30.12 | 42.82 |
| d28 | 43.00 | 10.62 | 8.52 |
| d31 | 11.70 | 14.42 | 3.83 |
| d52 | 6.64 | 6.64 | 6.64 |
| entrance P | 30.96 | 49.17 | 95.93 |
| exit p | 288.38 | 288.38 | 288.38 |
| front pp | 34.86 | 64.30 | 160.14 |
| rear pp | 2.79 | −7.76 | −47.26 |

Zoom Lens Unit Data

| unit | FS | FL | LUL | front pp | rear pp |
|---|---|---|---|---|---|
| 1 | 1 | 24.39 | 100.70 | 42.67 | 37.19 |
| 2 | 20 | −16.27 | 17.38 | 1.17 | −12.16 |
| 3 | 29 | −40.00 | 3.00 | −0.14 | −1.81 |
| 4 | 32 | 63.44 | 129.83 | 74.60 | −135.64 |

(Numerical Embodiment 3)

| i | r | d | nd | νd | θgF | ED | FL |
|---|---|---|---|---|---|---|---|
| 1 | 497.51526 | 2.50000 | 1.772500 | 49.50 | 0.5519 | 72.523 | −43.580 |
| 2 | 31.60427 | 12.90281 | 1.000000 | 0.00 | 0.0000 | 54.207 | 0.000 |
| 3 | 114.69887 | 1.85000 | 1.772500 | 49.50 | 0.5519 | 53.990 | −144.707 |
| 4 | 56.34925 | 12.65005 | 1.000000 | 0.00 | 0.0000 | 52.142 | 0.000 |
| 5 | −112.62951 | 1.75000 | 1.772500 | 49.50 | 0.5519 | 52.581 | −150.404 |
| 6 | −3216.80161 | 0.15000 | 1.000000 | 0.00 | 0.0000 | 53.944 | 0.000 |
| 7 | 88.00382 | 5.79285 | 1.805150 | 25.50 | 0.6156 | 56.431 | 121.656 |
| 8 | 777.89350 | 2.01992 | 1.000000 | 0.00 | 0.0000 | 56.358 | 0.000 |
| 9 | 754.15083 | 6.85593 | 1.603112 | 60.64 | 0.5414 | 56.317 | 126.112 |
| 10 | −84.67018 | 8.42290 | 1.000000 | 0.00 | 0.0000 | 56.242 | 0.000 |
| 11 | −32750.56153 | 9.19040 | 1.438750 | 94.99 | 0.5342 | 51.516 | 131.247 |
| 12 | −57.63256 | 1.65000 | 1.654115 | 39.70 | 0.5737 | 51.938 | −172.334 |
| 13 | −118.52427 | 0.15000 | 1.000000 | 0.00 | 0.0000 | 53.552 | 0.000 |
| 14 | 127.31367 | 1.65000 | 1.882210 | 23.78 | 0.6036 | 55.433 | −137.019 |
| 15 | 61.93990 | 9.97858 | 1.438750 | 94.99 | 0.5342 | 55.223 | 129.843 |

-continued

| | | | | | | | |
|---|---|---|---|---|---|---|---|
| 16 | −696.60865 | 0.18000 | 1.000000 | 0.00 | 0.0000 | 56.009 | 0.000 |
| 17 | 205.35980 | 11.70045 | 1.496999 | 81.54 | 0.5375 | 56.974 | 97.567 |
| 18 | −62.51588 | 0.18000 | 1.000000 | 0.00 | 0.0000 | 57.352 | 0.000 |
| 19 | 75.35035 | 7.92763 | 1.592400 | 68.30 | 0.5456 | 53.463 | 110.564 |
| 20 | −494.37360 | variable | 1.000000 | 0.00 | 0.0000 | 52.340 | 0.000 |
| 21 | 32.49370 | 0.75000 | 1.882997 | 40.76 | 0.5667 | 23.029 | −28.765 |
| 22 | 14.14708 | 3.99298 | 1.000000 | 0.00 | 0.0000 | 19.832 | 0.000 |
| 23 | 84.84168 | 0.75000 | 1.834000 | 37.16 | 0.5775 | 19.515 | −53.891 |
| 24 | 29.38398 | 3.55186 | 1.000000 | 0.00 | 0.0000 | 18.747 | 0.000 |
| 25 | −58.96432 | 6.04560 | 1.784723 | 25.68 | 0.6161 | 18.408 | 18.190 |
| 26 | −12.10110 | 0.80000 | 1.882997 | 40.76 | 0.5667 | 18.398 | −14.330 |
| 27 | −253.65649 | 0.13706 | 1.000000 | 0.00 | 0.0000 | 18.944 | 0.000 |
| 28 | 32.84217 | 2.50702 | 1.592701 | 35.31 | 0.5933 | 19.199 | 68.177 |
| 29 | 165.60896 | variable | 1.000000 | 0.00 | 0.0000 | 19.014 | 0.000 |
| 30 | −27.29709 | 0.75000 | 1.740999 | 52.64 | 0.5467 | 19.325 | −22.811 |
| 31 | 45.45094 | 2.33493 | 1.808095 | 22.76 | 0.6307 | 20.921 | 46.225 |
| 32 | −217.30806 | variable | 1.000000 | 0.00 | 0.0000 | 21.252 | 0.000 |
| 33 | 0.00000 | 1.40000 | 1.000000 | 0.00 | 0.0000 | 27.306 | 0.000 |
| 34 | 542.88958 | 3.08868 | 1.720000 | 43.69 | 0.5699 | 28.325 | 75.555 |
| 35 | −60.67748 | 0.15000 | 1.000000 | 0.00 | 0.0000 | 28.723 | 0.000 |
| 36 | 73.99391 | 3.90770 | 1.639999 | 60.07 | 0.5372 | 29.497 | 65.848 |
| 37 | −96.76937 | 0.22000 | 1.000000 | 0.00 | 0.0000 | 29.469 | 0.000 |
| 38 | 55.91255 | 6.24462 | 1.516330 | 64.14 | 0.5352 | 28.706 | 46.913 |
| 39 | −41.37922 | 1.00000 | 1.882997 | 40.76 | 0.5667 | 28.061 | −33.537 |
| 40 | 107.51631 | 34.00000 | 1.000000 | 0.00 | 0.0000 | 27.546 | 0.000 |
| 41 | 71.70949 | 5.19718 | 1.567322 | 42.80 | 0.5730 | 27.715 | 51.159 |
| 42 | −47.91739 | 0.30000 | 1.000000 | 0.00 | 0.0000 | 27.459 | 0.000 |
| 43 | −696.89119 | 1.00000 | 1.882997 | 40.76 | 0.5667 | 26.125 | −23.663 |
| 44 | 21.68388 | 6.16444 | 1.516330 | 64.14 | 0.5352 | 24.664 | 36.921 |
| 45 | −146.96232 | 0.20000 | 1.000000 | 0.00 | 0.0000 | 24.789 | 0.000 |
| 46 | 34.21408 | 7.74204 | 1.516330 | 64.14 | 0.5352 | 25.115 | 28.048 |
| 47 | −23.32121 | 1.00000 | 1.882997 | 40.76 | 0.5667 | 24.759 | −20.363 |
| 48 | 82.17483 | 0.87964 | 1.000000 | 0.00 | 0.0000 | 25.259 | 0.000 |
| 49 | 45.55541 | 6.21162 | 1.516330 | 64.14 | 0.5352 | 26.106 | 37.443 |
| 50 | −32.23088 | 4.00000 | 1.000000 | 0.00 | 0.0000 | 26.235 | 0.000 |
| 51 | 0.00000 | 33.00000 | 1.608590 | 46.44 | 0.5664 | 23.862 | 0.000 |
| 52 | 0.00000 | 13.20000 | 1.516800 | 64.17 | 0.5347 | 16.774 | 0.000 |
| 53 | 0.00000 | 0.00000 | 1.000000 | 0.00 | 0.0000 | 13.763 | 0.000 |

Aspheric Surface Data

1st surface

| | | |
|---|---|---|
| K = 1.22038e+002 | A4 = 2.53837e−006 | A6 = −2.87657e−010 |
| A8 = −2.07660e−013 | A10 = −1.06570e−016 | A12 = 1.95302e−020 |
| A3 = −3.54481e−006 | A5 = −3.22306e−008 | A7 = 8.19704e−012 |
| A9 = 1.05404e−014 | A11 = −2.16883e−018 | |

10th surface

| | | |
|---|---|---|
| K = 8.38442e−001 | A4 = 8.93876e−007 | A6 = −6.79823e−010 |
| A8 = −2.80406e−013 | A10 = 1.04654e−015 | A12 = −3.21884e−019 |
| A3 = 1.46404e−006 | A5 = 1.34063e−008 | A7 = −3.07921e−012 |
| A9 = −4.86415e−015 | A11 = −1.19457e−017 | |

13th surface

| | | |
|---|---|---|
| K = −4.68364e+000 | A4 = 5.18349e−007 | A6 = 3.65391e−010 |
| A8 = 3.84546e−013 | A10 = −2.50678e−016 | A12 = 2.99364e−019 |
| A3 = −1.50551e−006 | A5 = −4.22288e−009 | A7 = 5.78921e−012 |
| A9 = −6.44557e−015 | A11 = −4.63750e−018 | |

Various Data
zoom ratio 11.45

| | wide angle | intermediate | telephoto |
|---|---|---|---|
| focal length | 5.50 | 18.59 | 63.00 |
| F-number | 1.90 | 1.90 | 2.80 |
| half view angle | 4.00 | 16.48 | 4.99 |
| image height | 5.50 | 5.50 | 5.50 |
| full lens length | 304.69 | 304.69 | 304.69 |
| BF | 7.91 | 7.91 | 7.91 |
| d20 | 0.46 | 26.54 | 38.20 |
| d29 | 35.72 | 7.58 | 9.50 |
| d32 | 12.57 | 14.63 | 1.05 |
| d53 | 7.91 | 7.91 | 7.91 |
| entrance P | 32.76 | 54.31 | 102.88 |
| exit p | 453.02 | 453.02 | 453.02 |
| front pp | 38.33 | 73.68 | 174.79 |
| rear pp | 2.41 | −10.68 | −55.09 |

-continued

Zoom Lens Unit Data

| unit | FS | FL | LUL | front pp | rear pp |
|---|---|---|---|---|---|
| 1 | 1 | 27.10 | 97.50 | 42.74 | 31.44 |
| 2 | 21 | −17.40 | 18.63 | 1.75 | −12.44 |
| 3 | 30 | −46.00 | 3.08 | −0.33 | −2.06 |
| 4 | 33 | 58.06 | 128.91 | 64.63 | −118.37 |

(Numerical Embodiment 4)

| i | r | d | nd | νd | θgF | ED | FL |
|---|---|---|---|---|---|---|---|
| 1 | 497.51526 | 2.50000 | 1.772500 | 49.50 | 0.5519 | 83.227 | −42.123 |
| 2 | 30.61263 | 16.06283 | 1.000000 | 0.00 | 0.0000 | 56.996 | 0.000 |
| 3 | 104.02302 | 1.85000 | 1.772500 | 49.50 | 0.5519 | 56.850 | −242.399 |
| 4 | 66.46715 | 9.53815 | 1.000000 | 0.00 | 0.0000 | 55.338 | 0.000 |
| 5 | −177.77137 | 1.75000 | 1.772500 | 49.50 | 0.5519 | 55.350 | −93.468 |
| 6 | 123.10296 | 0.15000 | 1.000000 | 0.00 | 0.0000 | 56.374 | 0.000 |
| 7 | 87.67241 | 7.83606 | 1.805150 | 25.50 | 0.6156 | 57.547 | 102.784 |
| 8 | −1693.81503 | 3.06303 | 1.000000 | 0.00 | 0.0000 | 57.606 | 0.000 |
| 9 | −319.31065 | 6.48099 | 1.603112 | 60.64 | 0.5414 | 57.629 | 160.694 |
| 10 | −75.14495 | 0.15000 | 1.000000 | 0.00 | 0.0000 | 57.762 | 0.000 |
| 11 | −331.49625 | 7.26990 | 1.438750 | 94.99 | 0.5342 | 54.797 | 202.914 |
| 12 | −70.79058 | 1.65000 | 1.720467 | 34.70 | 0.5834 | 54.516 | −200.815 |
| 13 | −139.06665 | 6.19135 | 1.000000 | 0.00 | 0.0000 | 55.265 | 0.000 |
| 14 | 151.31074 | 1.65000 | 1.882210 | 23.78 | 0.6036 | 57.198 | −140.833 |
| 15 | 68.24131 | 12.24560 | 1.438750 | 94.99 | 0.5342 | 57.527 | 108.269 |
| 16 | −148.97276 | 0.18000 | 1.000000 | 0.00 | 0.0000 | 58.708 | 0.000 |
| 17 | 445.12895 | 6.89005 | 1.438750 | 94.99 | 0.5342 | 60.342 | 219.937 |
| 18 | −123.01776 | 0.18000 | 1.000000 | 0.00 | 0.0000 | 60.811 | 0.000 |
| 19 | 227.91378 | 8.07936 | 1.496999 | 81.54 | 0.5375 | 61.464 | 159.004 |
| 20 | −120.07866 | 0.18000 | 1.000000 | 0.00 | 0.0000 | 61.426 | 0.000 |
| 21 | 90.06935 | 8.38412 | 1.592400 | 68.30 | 0.5456 | 58.683 | 117.486 |
| 22 | −300.17372 | variable | 1.000000 | 0.00 | 0.0000 | 57.762 | 0.000 |
| 23 | 27.96707 | 0.75000 | 1.882997 | 40.76 | 0.5667 | 20.818 | −31.073 |
| 24 | 13.71530 | 3.23392 | 1.000000 | 0.00 | 0.0000 | 18.112 | 0.000 |
| 25 | 84.17301 | 0.75000 | 1.834000 | 37.16 | 0.5775 | 17.854 | −40.461 |
| 26 | 24.09897 | 3.74277 | 1.000000 | 0.00 | 0.0000 | 16.852 | 0.000 |
| 27 | −28.21880 | 5.05011 | 1.784723 | 25.68 | 0.6161 | 16.449 | 17.706 |
| 28 | −10.10793 | 0.80000 | 1.882997 | 40.76 | 0.5667 | 16.556 | −13.068 |
| 29 | −81.20738 | 0.13706 | 1.000000 | 0.00 | 0.0000 | 17.422 | 0.000 |
| 30 | 48.19190 | 2.97928 | 1.592701 | 35.31 | 0.5933 | 17.651 | 47.409 |
| 31 | −66.90589 | variable | 1.000000 | 0.00 | 0.0000 | 17.717 | 0.000 |
| 32 | −27.36425 | 0.75000 | 1.740999 | 52.64 | 0.5467 | 18.156 | −23.542 |
| 33 | 49.29727 | 2.27041 | 1.808095 | 22.76 | 0.6307 | 19.537 | 49.265 |
| 34 | −213.94979 | variable | 1.000000 | 0.00 | 0.0000 | 19.946 | 0.000 |
| 35 | 0.00000 | 1.40000 | 1.000000 | 0.00 | 0.0000 | 27.295 | 0.000 |
| 36 | 542.88958 | 3.08868 | 1.720000 | 43.69 | 0.5699 | 28.315 | 75.555 |
| 37 | −60.67748 | 0.15000 | 1.000000 | 0.00 | 0.0000 | 28.713 | 0.000 |
| 38 | 73.99391 | 3.90770 | 1.639999 | 60.07 | 0.5372 | 29.490 | 65.848 |
| 39 | −96.76937 | 0.22000 | 1.000000 | 0.00 | 0.0000 | 29.463 | 0.000 |
| 40 | 55.91255 | 6.24462 | 1.516330 | 64.14 | 0.5352 | 28.703 | 46.913 |
| 41 | −41.37922 | 1.00000 | 1.882997 | 40.76 | 0.5667 | 28.058 | −33.537 |
| 42 | 107.51631 | 34.00000 | 1.000000 | 0.00 | 0.0000 | 27.546 | 0.000 |
| 43 | 71.70949 | 5.19718 | 1.567322 | 42.80 | 0.5730 | 27.744 | 51.159 |
| 44 | −47.91739 | 0.30000 | 1.000000 | 0.00 | 0.0000 | 27.490 | 0.000 |
| 45 | −696.89119 | 1.00000 | 1.882997 | 40.76 | 0.5667 | 26.154 | −23.663 |
| 46 | 21.68388 | 6.16444 | 1.516330 | 64.14 | 0.5352 | 24.691 | 36.921 |
| 47 | −146.96232 | 0.20000 | 1.000000 | 0.00 | 0.0000 | 24.615 | 0.000 |
| 48 | 34.21408 | 7.74204 | 1.516330 | 64.14 | 0.5352 | 24.172 | 28.048 |
| 49 | −23.32121 | 1.00000 | 1.882997 | 40.76 | 0.5667 | 23.321 | −20.363 |
| 50 | 82.17483 | 0.87964 | 1.000000 | 0.00 | 0.0000 | 23.720 | 0.000 |
| 51 | 45.55541 | 6.21162 | 1.516330 | 64.14 | 0.5352 | 24.464 | 37.411 |
| 52 | −32.18297 | 4.00000 | 1.000000 | 0.00 | 0.0000 | 24.640 | 0.000 |
| 53 | 0.00000 | 33.00000 | 1.608590 | 46.44 | 0.5664 | 22.611 | 0.000 |
| 54 | 0.00000 | 13.20000 | 1.516800 | 64.17 | 0.5347 | 16.222 | 0.000 |
| 55 | 0.00000 | 0.00000 | 1.000000 | 0.00 | 0.0000 | 13.509 | 0.000 |

Aspheric Surface Data

1st surface

K = 1.22038e+002    A4 = 2.53837e−006    A6 = −2.87657e−010
A8 = −2.07660e−013    A10 = 1.06570e−016    A12 = 1.95302e−020
A3 = −3.54481e−006    A5 = −3.22306e−008    A7 = 8.19704e−012

-continued

| | | |
|---|---|---|
| A9 = 1.05404e−014 | A11 = −2.16883e−018 | |

10th surface

| | | |
|---|---|---|
| K = 7.05960e−001 | A4 = 2.85924e−007 | A6 = −4.91785e−010 |
| A8 = −5.15859e−013 | A10 = 1.20883e−015 | A12 = −6.84909e−019 |
| A3 = 5.62400e−006 | A5 = 2.11908e−008 | A7 = −1.76532e−011 |
| A9 = 1.82369e−014 | A11 = 7.62810e−019 | |

13th surface

| | | |
|---|---|---|
| K = −9.56112e−001 | A4 = 3.56634e−007 | A6 = 1.77109e−010 |
| A8 = 2.02544e−013 | A10 = −4.26967e−016 | A12 = 4.21405e−019 |
| A3 = −4.67533e−006 | A5 = −1.30225e−008 | A7 = 1.4399e−011 |
| A9 = 3.29094e−015 | A11 = −6.21099e−018 | |

Various Data
zoom ratio 14.00

| | wide angle | intermediate | telephoto |
|---|---|---|---|
| focal length | 4.50 | 16.84 | 63.00 |
| F-number | 1.90 | 1.90 | 2.80 |
| half view angle | 50.71 | 18.09 | 4.99 |
| image height | 5.50 | 5.50 | 5.50 |
| full lens length | 313.28 | 313.28 | 313.28 |
| BF | 7.92 | 7.92 | 7.92 |
| d22 | 0.46 | 31.37 | 44.52 |
| d31 | 41.55 | 7.49 | 8.14 |
| d34 | 11.70 | 14.85 | 1.05 |
| d55 | 7.92 | 7.92 | 7.92 |
| entrance P | 31.47 | 52.60 | 103.64 |
| exit p | 447.43 | 447.43 | 447.43 |
| front pp | 36.02 | 70.09 | 175.67 |
| rear pp | 3.42 | −8.92 | −55.08 |

Zoom Lens Unit Data

| unit | FS | FL | LUL | front pp | rear pp |
|---|---|---|---|---|---|
| 1 | 1 | 27.10 | 102.28 | 43.56 | 36.81 |
| 2 | 23 | −17.40 | 17.44 | 0.79 | −13.80 |
| 3 | 32 | −46.00 | 3.02 | −0.32 | −2.02 |
| 4 | 35 | 58.10 | 128.91 | 64.75 | −118.43 |

(Numerical Embodiment 5)

| i | r | d | nd | νd | θgF | ED | FL |
|---|---|---|---|---|---|---|---|
| 1 | 497.51526 | 2.50000 | 1.772500 | 49.50 | 0.5519 | 83.034 | −44.438 |
| 2 | 32.18618 | 15.47749 | 1.000000 | 0.00 | 0.0000 | 58.273 | 0.000 |
| 3 | 123.94714 | 1.85000 | 1.772500 | 49.50 | 0.5519 | 58.069 | −156.816 |
| 4 | 61.01170 | 11.64275 | 1.000000 | 0.00 | 0.0000 | 55.591 | 0.000 |
| 5 | −106.87289 | 1.75000 | 1.772500 | 49.50 | 0.5519 | 55.470 | 100.407 |
| 6 | 289.91870 | 0.15000 | 1.000000 | 0.00 | 0.0000 | 56.699 | 0.000 |
| 7 | 87.59834 | 5.94049 | 1.805150 | 25.50 | 0.6156 | 58.563 | 122.663 |
| 8 | 700.95918 | 2.59125 | 1.000000 | 0.00 | 0.0000 | 58.463 | 0.000 |
| 9 | −18117.95838 | 7.18554 | 1.603112 | 60.64 | 0.5414 | 58.362 | 130.033 |
| 10 | −78.40394 | 6.79855 | 1.000000 | 0.00 | 0.0000 | 58.306 | 0.000 |
| 11 | 460.49852 | 9.20985 | 1.438750 | 94.99 | 0.5342 | 54.901 | 118.658 |
| 12 | −58.50397 | 1.65000 | 1.720467 | 34.70 | 0.5834 | 54.813 | −137.208 |
| 13 | −143.61723 | 0.15000 | 1.000000 | 0.00 | 0.0000 | 56.208 | 0.000 |
| 14 | 120.54939 | 1.65000 | 1.870000 | 29.30 | 0.6035 | 59.082 | −144.685 |
| 15 | 61.42095 | 11.69187 | 1.438750 | 94.99 | 0.5342 | 59.103 | 113.169 |
| 16 | −247.32077 | 0.18000 | 1.000000 | 0.00 | 0.0000 | 59.932 | 0.000 |
| 17 | 235.02890 | 11.40898 | 1.496999 | 81.54 | 0.5375 | 61.600 | 110.560 |
| 18 | −70.82646 | 0.18000 | 1.000000 | 0.00 | 0.0000 | 62.004 | 0.000 |
| 19 | 85.27870 | 9.25009 | 1.592400 | 68.30 | 0.5456 | 59.265 | 103.787 |
| 20 | −214.09308 | variable | 1.000000 | 0.00 | 0.0000 | 58.478 | 0.000 |
| 21 | 27.95513 | 0.75000 | 1.882997 | 40.76 | 0.5667 | 21.175 | −29.706 |
| 22 | 13.40188 | 3.66688 | 1.000000 | 0.00 | 0.0000 | 18.297 | 0.000 |
| 23 | 153.29153 | 0.75000 | 1.834000 | 37.16 | 0.5775 | 18.030 | −39.613 |
| 24 | 27.26110 | 3.65856 | 1.000000 | 0.00 | 0.0000 | 17.127 | 0.000 |
| 25 | −30.18504 | 5.09509 | 1.784723 | 25.68 | 0.6161 | 16.757 | 18.166 |
| 26 | −10.46929 | 0.80000 | 1.882997 | 40.76 | 0.5667 | 16.902 | −14.400 |
| 27 | −59.79397 | 0.13706 | 1.000000 | 0.00 | 0.0000 | 17.778 | 0.000 |
| 28 | 42.67963 | 2.39861 | 1.592701 | 35.31 | 0.5933 | 17.966 | 56.866 |
| 29 | −162.02963 | variable | 1.000000 | 0.00 | 0.0000 | 17.854 | 0.000 |

-continued

| | | | | | | | |
|---|---|---|---|---|---|---|---|
| 30 | −26.78828 | 0.75000 | 1.740999 | 52.64 | 0.5467 | 18.193 | −23.809 |
| 31 | 52.99042 | 2.23891 | 1.808095 | 22.76 | 0.6307 | 19.590 | 50.520 |
| 32 | −182.56812 | variable | 1.000000 | 0.00 | 0.0000 | 20.005 | 0.000 |
| 33 | 0.00000 | 1.40000 | 1.000000 | 0.00 | 0.0000 | 27.348 | 0.000 |
| 34 | 542.88958 | 3.08868 | 1.720000 | 43.69 | 0.5699 | 28.369 | 75.555 |
| 35 | −60.67748 | 0.15000 | 1.000000 | 0.00 | 0.0000 | 28.766 | 0.000 |
| 36 | 73.99391 | 3.90770 | 1.639999 | 60.07 | 0.5372 | 29.543 | 65.848 |
| 37 | −96.76937 | 0.22000 | 1.000000 | 0.00 | 0.0000 | 29.516 | 0.000 |
| 38 | 55.91255 | 6.24462 | 1.516330 | 64.14 | 0.5352 | 28.749 | 46.913 |
| 39 | −41.37922 | 1.00000 | 1.882997 | 40.76 | 0.5667 | 28.108 | −33.537 |
| 40 | 107.51631 | 34.00000 | 1.000000 | 0.00 | 0.0000 | 27.591 | 0.000 |
| 41 | 71.70949 | 5.19718 | 1.567322 | 42.80 | 0.5730 | 27.766 | 51.159 |
| 42 | −47.91739 | 0.30000 | 1.000000 | 0.00 | 0.0000 | 27.512 | 0.000 |
| 43 | −696.89119 | 1.00000 | 1.882997 | 40.76 | 0.5667 | 26.171 | −23.663 |
| 44 | 21.68388 | 6.16444 | 1.516330 | 64.14 | 0.5352 | 24.703 | 36.921 |
| 45 | −146.96232 | 0.20000 | 1.000000 | 0.00 | 0.0000 | 24.627 | 0.000 |
| 46 | 34.21408 | 7.74204 | 1.516330 | 64.14 | 0.5352 | 24.321 | 28.048 |
| 47 | −23.32121 | 1.00000 | 1.882997 | 40.76 | 0.5667 | 23.910 | −20.363 |
| 48 | 82.17483 | 0.87964 | 1.000000 | 0.00 | 0.0000 | 24.368 | 0.000 |
| 49 | 45.55541 | 6.21162 | 1.516330 | 64.14 | 0.5352 | 25.151 | 37.431 |
| 50 | −32.21255 | 4.00000 | 1.000000 | 0.00 | 0.0000 | 25.308 | 0.000 |
| 51 | 0.00000 | 33.00000 | 1.608590 | 46.44 | 0.5664 | 23.138 | 0.000 |
| 52 | 0.00000 | 13.20000 | 1.516800 | 64.17 | 0.5347 | 16.453 | 0.000 |
| 53 | 0.00000 | 0.00000 | 1.000000 | 0.00 | 0.0000 | 13.613 | 0.000 |

Aspheric Surface Data

1st surface

| | | |
|---|---|---|
| K = 1.22038e+002 | A4 = 2.53837e−006 | A6 = −2.87657e−010 |
| A8 = −2.07660e−013 | A10 = −1.06570e−016 | A12 = 1.95302e−020 |
| A3 = −3.54481e−006 | A5 = −3.22306e−008 | A7 = 8.19704e−012 |
| A9 = 1.05404e−014 | A11 = −2.16883e−018 | |

10th surface

| | | |
|---|---|---|
| K = 1.61926e+000 | A4 = 7.96782e−007 | A6 = −3.85942e−010 |
| A8 = −3.18824e−013 | A10 = 1.01350e−015 | A12 = −2.49582e−019 |
| A3 = 7.49980e−007 | A5 = 2.00124e−008 | A7 = −7.82206e−012 |
| A9 = −1.07535e−014 | A11 = −3.95810e−018 | |

13th surface

| | | |
|---|---|---|
| K = −6.65231e+000 | A4 = 5.35180e−007 | A6 = 1.80713e−010 |
| A8 = 3.58825e−013 | A10 = −3.03554e−016 | A12 = 3.02485e−019 |
| A3 = −5.73996e−007 | A5 = −7.41271e−009 | A7 = 1.03417e−011 |
| A9 = −6.97674e−015 | A11 = −5.40354e−018 | |

Various Data
zoom ratio 14.00

| | wide angle | intermediate | telephoto |
|---|---|---|---|
| focal length | 4.50 | 16.84 | 63.00 |
| F-number | 1.90 | 1.90 | 2.80 |
| half view angle | 50.71 | 18.09 | 4.99 |
| image height | 5.50 | 5.50 | 5.50 |
| full lens length | 312.26 | 312.26 | 312.26 |
| BF | 7.91 | 7.91 | 7.91 |
| d20 | 0.46 | 31.37 | 44.52 |
| d29 | 41.78 | 7.72 | 8.37 |
| d32 | 11.70 | 14.85 | 1.05 |
| d53 | 7.91 | 7.91 | 7.91 |
| entrance P | 31.69 | 52.82 | 103.91 |
| exit p | 40.873 | 450.87 | 450.87 |
| front pp | 36.24 | 70.30 | 175.87 |
| rear pp | 3.41 | −8.93 | −55.09 |

Zoom Lens Unit Data

| unit | FS | FL | LUL | front pp | rear pp |
|---|---|---|---|---|---|
| 1 | 1 | 27.10 | 101.26 | 43.78 | 36.87 |
| 2 | 21 | −17.40 | 17.26 | 0.85 | −13.62 |
| 3 | 30 | −46.00 | 2.99 | −0.37 | −2.05 |
| 4 | 33 | 58.07 | 128.91 | 64.67 | −118.39 |

TABLE 1

Values Associated With Conditional Expressions
In Numerical Embodiments 1 to 5

| Conditional expression | Term | Numeral embodiment 1 | Numeral embodiment 2 | Numeral embodiment 3 |
|---|---|---|---|---|
| (1) | $(\theta pa - \theta na)/(\nu pa - \nu na)$ | $-1.07 \times 10^{-3}$ | $-1.07 \times 10^{-3}$ | $-1.07 \times 10^{-3}$ |
| (2) | $\nu n$ | 23.8 | 23.8 | 23.8 |
| (3) | ftele/f1 | 2.32 | 2.21 | 2.32 |
| (4) | ftele/f1c | 1.299 | 1.271 | 1.299 |
| (5) | Nn | 1.88221 | 1.88221 | 1.88221 |
| (6) | $\phi p/\phi 1c$ | 1.64 | 1.45 | 1.68 |
| (7) | $\phi n/\phi 1c$ | −0.57 | −0.32 | −0.64 |
| (9) | fwide/IS | 0.41 | 0.35 | 0.50 |
| (8) | ftele/fwide | 14.0 | 14.0 | 11.5 |

| Conditional expression | term | Numeral embodiment 4 | Numeral embodiment 5 |
|---|---|---|---|
| (1) | $(\theta pa - \theta na)/(\nu pa - \nu na)$ | $-1.07 \times 10^{-3}$ | $-1.18 \times 10^{-3}$ |
| (2) | $\nu n$ | 23.8 | 29.3 |
| (3) | ftele/f1 | 2.32 | 2.32 |
| (4) | ftele/f1c | 1.299 | 1.299 |
| (5) | Nn | 1.88221 | 1.87000 |
| (6) | $\phi p/\phi 1c$ | 1.39 | 1.74 |
| (7) | $\phi n/\phi 1c$ | −0.34 | −0.69 |
| (9) | fwide/IS | 0.41 | 0.41 |
| (8) | ftele/fwide | 14.0 | 14.0 |

Figure 13:
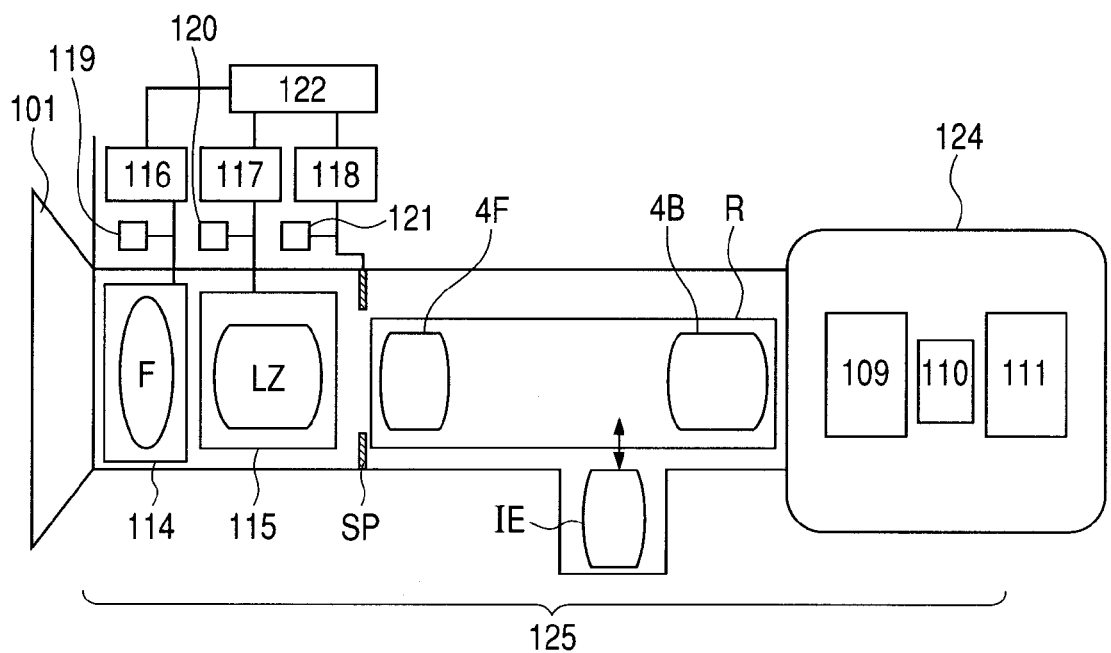
FIG. 13 is a diagram schematically showing relevant portions of an image pickup apparatus according to the present invention.

FIG. 13 is a diagram showing the relevant portions of an image pickup apparatus (television camera system) that uses, as a taking optical system, a zoom lens according to any one of the embodiments. In FIG. 13, the image pickup apparatus 125 has a zoom lens 101 according to any one of the first to fourth embodiments and a camera 124. The zoom lens 101 is detachably mounted on the camera 124. The image pickup apparatus 125 is composed of the camera 124 and the zoom lens 101 mounted thereon. The zoom lens 101 includes a first lens unit F, a magnification changing section (magnification changing lens unit) LZ, and a fourth lens unit R for imaging. The lens unit F includes a focusing lens unit. The magnification changing section LZ includes a second lens unit V that moves along the optical axis for magnification changing (zooming) and a third lens unit C that moves along the optical axis for compensating variations of the image plane during magnification changing.

The image pickup apparatus 125 has an aperture stop SP. The fourth lens unit R includes a front lens unit 4F and a rear lens unit 4B, and a lens unit IE that can be inserted/retracted into/out of the optical path. The lens unit IE provides a shift of the focal length range of the entire system of the zoom lens 101. The zoom lens 101 is provided with drive mechanisms 114 and 115 including helicoids and cams that drive the lens unit F and the magnification changing section LZ respectively in the direction along the optical axis. There are also provided motors (drive units) 116 to 118 that electrically drive the drive mechanisms 114, 115 and the aperture stop SP. There are also provided detectors 119 to 121 such as encoders, potentiometers, or photo sensors that detect or sense the positions of the first lens unit F and the magnification changing section LZ on the optical axis and the stop diameter of the aperture stop SP. The camera 124 has a glass block 109 such as an optical filter or color separating prism provided and a solid state image pickup element (or photoelectric transducer element) 110 such as a CCD sensor or a CMOS sensor that receives an object image formed by the zoom lens 101. The image pickup apparatus 125 also has a CPUs 111 and 122 that control various operations of the camera 124 and the zoom lens 101. As described above, an image pickup apparatus having high optical performance can be achieved by applying the zoom lens according to the present invention to a television camera.

According to the embodiments of the present invention, there can be provided zoom lenses having a high zoom ratio and a wide angle of view and having high optical performance throughout the entire zoom range from the wide angle end to the telephoto end with good correction of chromatic aberration throughout the entire zoom range.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-188459, filed Aug. 17, 2009, which is hereby incorporated by reference herein in its entirety.

What is claimed is:

1. A zoom lens comprising, in order from the object side to the image side:
   a first unit having a positive refractive power that is not moved for zooming;
   a second unit having a negative refractive power that is moved during zooming;
   a third unit having a negative refractive power that is moved during zooming; and
   a fourth unit having a positive refractive power that is not moved for zooming,
   wherein the first unit includes, in order from the object side to the image side, a front side partial unit having a negative refractive power that is not moved for focusing, a movable partial unit having a positive refractive power that is moved for focusing, and a rear side partial unit having a positive refractive power that is not moved for focusing,
   the rear side partial unit includes a plurality of positive lenses and one or more negative lenses, and
   the following conditions are satisfied:

$-1.2 \times 10^{-3} < (\theta pa - \theta n)/(\nu pa - \nu n)$, and $\nu n < 30$, where $\nu n$ is the Abbe number of the material of the negative lens that has the smallest Abbe number among the one or more negative lenses, $\theta n$ is the partial dispersion ratio of the material of the negative lens that has the smallest Abbe number among the one or more negative lenses, $\nu pa$ is the average of the Abbe numbers $\nu$ of the materials of the plurality of positive lenses, and $\theta pa$ is the average of the partial dispersion ratios $\theta$ of the materials of the plurality of positive lenses, and
   where the partial dispersion ratio $\theta$ is provided by and equation of:

$\theta = (Ng - NF)/(NF - NC)$, where Ng is a refractive index of g-line, NF is a refractive index of F-line, and NC is a refractive index of C-line.

2. A zoom lens according to claim 1, wherein the following condition is satisfied:

$2.2 < ftele/f1$, where f1 is the focal length of the first unit, and ftele is the focal length of the entire system at the telephoto end.

3. A zoom lens according to claim 1, wherein the following condition is satisfied:

$$1.27 < ftele/f1c,$$

where $f1c$ is the focal length of the rear side partial unit, and $ftele$ is the focal length of the entire system at the telephoto end.

4. A zoom lens according to claim 1, wherein the following condition is satisfied:

$$1.86 < Nn,$$

where $Nn$ is the refractive index of the material of the negative lens that has the smallest Abbe number among the one or more negative lenses in the rear side partial unit.

5. A zoom lens according to claim 1, wherein the following conditions are satisfied:

$$\phi p/\phi 1c < 1.9, \text{ and}$$

$$-0.9 < \phi n/\phi 1c,$$

where $\phi p$ is the sum of the refractive powers of the plurality of positive lenses in the rear side partial unit, $\phi n$ is the sum of the refractive powers of the one or more negative lenses in the rear side partial unit, $\phi 1c$ is the refractive power of the entire rear side partial unit.

6. A zoom lens according to claim 1, wherein the following condition is satisfied:

$$11 < ftele/fwide,$$

where $fwide$ is the focal length of the entire system at the wide angle end, and $ftele$ is the focal length of the entire system at the telephoto end.

7. A zoom lens according to claim 1, wherein the rear side partial unit comprises, in order from the object side to the image side, a first cemented lens made up of a positive lens and a negative lens that are cemented together, a second cemented lens made up of a negative lens and a positive lens that are cemented together, a positive lens, and a positive lens.

8. A zoom lens according to claim 1, wherein the rear side partial unit comprises, in order from the object side to the image side, a positive lens, a cemented lens made up of a negative lens and a positive lens that are cemented together, a positive lens, and a positive lens.

9. A zoom lens according to claim 1, wherein the rear side partial unit comprises, in order from the object side to the image side, a cemented lens made up of a negative lens and a positive lens that are cemented together, a positive lens, a positive lens, and a positive lens.

10. An image pickup apparatus comprising:
a zoom lens; and
a solid state image pickup element that receives an image formed by the zoom lens,
wherein the zoom lens comprising, in order from the object side toward the solid state image pickup element, a first unit having a positive refractive power that is not moved for zooming, a second unit having a negative refractive power that is moved during zooming, a third unit having a negative refractive power that is moved during zooming, and a fourth unit having a positive refractive power that is not moved for zooming, wherein the first unit includes, in order from the object side to the image side, a front side partial unit having a negative refractive power that is not moved for focusing, a movable partial unit having a positive refractive power that is moved for focusing, and a rear side partial unit having a positive refractive power that is not moved for focusing,
wherein the rear side partial unit includes a plurality of positive lenses and one or more negative lenses, and the following conditions are satisfied:

$$-1.2 \times 10^{-3} < (\theta pa - \theta n)/(\nu pa - \nu n), \text{ and}$$

$$\nu n < 30,$$

where $\nu n$ is the Abbe number of the material of the negative lens that has the smallest Abbe number among the one or more negative lenses, $\theta n$ is the partial dispersion ratio of the material of the negative lens that has the smallest Abbe number among the one or more negative lenses, $\nu pa$ is the average of the Abbe numbers $\nu$ of the materials of the plurality of positive lenses, and $\theta pa$ is the average of the partial dispersion ratios $\theta$ of the materials of the plurality of positive lenses,
where the partial dispersion ratio $\theta$ is provided by and equation of:

$$\theta = (Ng - NF)/(NF - NC),$$

where $Ng$ is a refractive index of g-line, $NF$ is a refractive index of F-line, and $NC$ is a refractive index of C-line.

11. An image pickup apparatus according to claim 10, wherein the following condition is satisfied:

$$0.34 < fwide/IS < 0.60$$

where $fwide$ is the focal length of the entire system at the wide angle end, and $IS$ is the diagonal length of the image area of the solid state image pickup element.

* * * * *